United States Patent
Park et al.

(10) Patent No.: US 10,108,260 B2
(45) Date of Patent: Oct. 23, 2018

(54) VEHICLE CONTROL APPARATUS AND METHOD THEREOF

(71) Applicant: LG ELECTRONICS INC., Seoul (KR)

(72) Inventors: Hyungmin Park, Seoul (KR); Hyun Kim, Seoul (KR); Choil Lee, Seoul (KR); Joongrock Kim, Seoul (KR); Injun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/419,036

(22) Filed: Jan. 30, 2017

(65) Prior Publication Data

US 2017/0285741 A1 Oct. 5, 2017

Related U.S. Application Data

(60) Provisional application No. 62/316,584, filed on Apr. 1, 2016.

(30) Foreign Application Priority Data

Jul. 22, 2016 (KR) .................... 10-2016-0093636

(51) Int. Cl.
*G06K 9/00* (2006.01)
*G06F 3/01* (2006.01)
(Continued)

(52) U.S. Cl.
CPC ............... *G06F 3/013* (2013.01); *B60J 1/02* (2013.01); *B60R 11/04* (2013.01);
(Continued)

(58) Field of Classification Search
CPC .... G06F 3/013; G06F 3/01; G06T 7/80; B60J 1/02; B60R 11/04; G06K 9/00604;
(Continued)

(56) References Cited

U.S. PATENT DOCUMENTS 6,611,283 B1 * 8/2003 Isonuma ............ H04N 13/0014
348/51
2005/0100191 A1 5/2005 Harbach et al.
(Continued)

FOREIGN PATENT DOCUMENTS

JP   2007-259931 A   10/2007
JP   2009-15533 A    1/2009
(Continued)

*Primary Examiner* — Duy M Dang
(74) *Attorney, Agent, or Firm* — Birch, Stewart, Kolasch & Birch, LLP

(57) ABSTRACT

A vehicle control apparatus for a vehicle, and including a display configured to display image information associated with the vehicle; at least one light source configured to emit light so as to form at least one reflected light in one region of a pupil and eyeball of a user gazing at one region on the display; a memory configured to store coordinate information on each region within the vehicle and the at least one light source; at least one camera configured to obtain an image including the one region of the pupil and eyeball of the user; and a controller configured to calculate a first coordinate from a center of the pupil and calculate a second coordinate from the at least one reflected light included in the obtained image, calculate a coordinate of one point within the vehicle as a reference coordinate from prestored coordinate information of the at least one light source when a distance between the first coordinate and the second coordinate is less than a preset distance, and perform calibration on the reference coordinate for a coordinate corresponding to a direction in which the user gazes.

20 Claims, 15 Drawing Sheets

(51) Int. Cl.
     *H04N 5/225*     (2006.01)
     *G06T 7/80*     (2017.01)
     *B60J 1/02*     (2006.01)
     *B60R 11/04*     (2006.01)

(52) U.S. Cl.
     CPC ..... *G06K 9/00604* (2013.01); *G06K 9/00617* (2013.01); *G06T 7/80* (2017.01); *H04N 5/2256* (2013.01)

(58) Field of Classification Search
     CPC .... G06K 9/00617; G06K 9/00; H04N 5/2256; B60W 50/08; B60W 50/14; B60W 50/00; G02B 27/01; G02B 27/02; A61B 3/14; G09G 5/00; B60K 35/00
     See application file for complete search history.

(56) References Cited

U.S. PATENT DOCUMENTS

| | | | |
|---|---|---|---|
| 2007/0222947 A1 | 9/2007 | Kimata et al. | |
| 2010/0013949 A1* | 1/2010 | Miyamoto | A61B 3/113 348/222.1 |
| 2012/0200490 A1 | 8/2012 | Inada | |
| 2014/0049452 A1 | 2/2014 | Maltz | |

FOREIGN PATENT DOCUMENTS

| | | |
|---|---|---|
| JP | 2011-217764 A | 11/2011 |
| KR | 10-2013-0107981 A | 10/2013 |
| KR | 10-2014-0090549 A | 7/2014 |

* cited by examiner

FIG. 2B
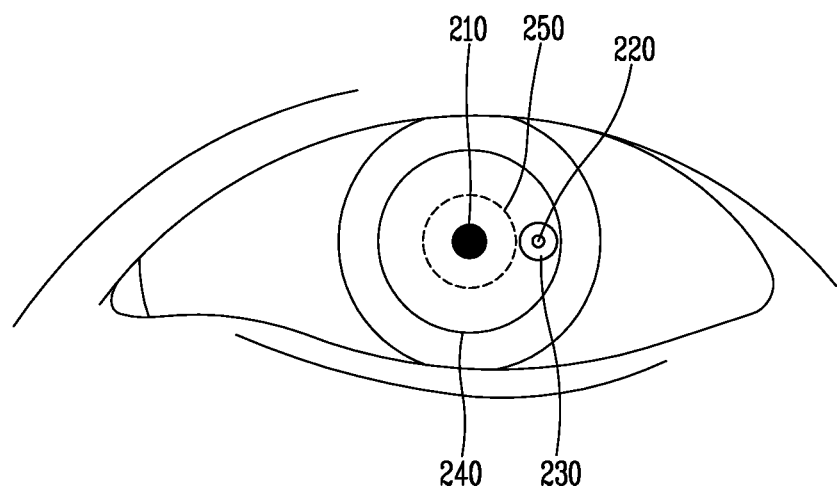
(a)
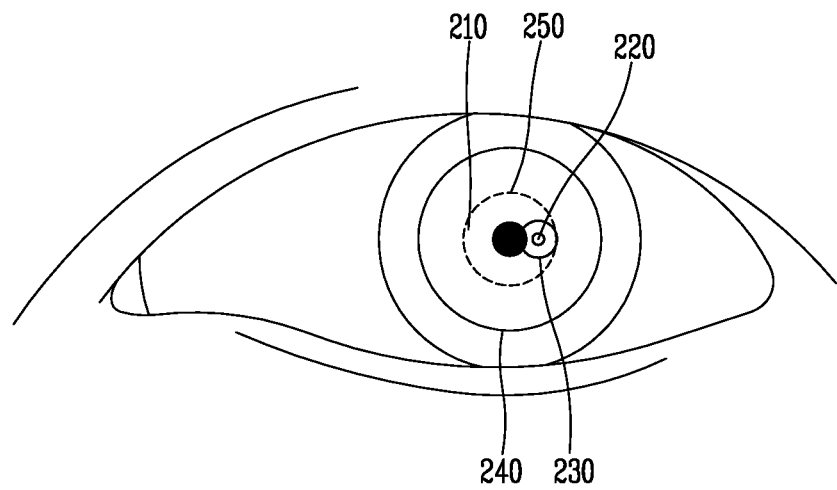
(b)

FIG. 3B
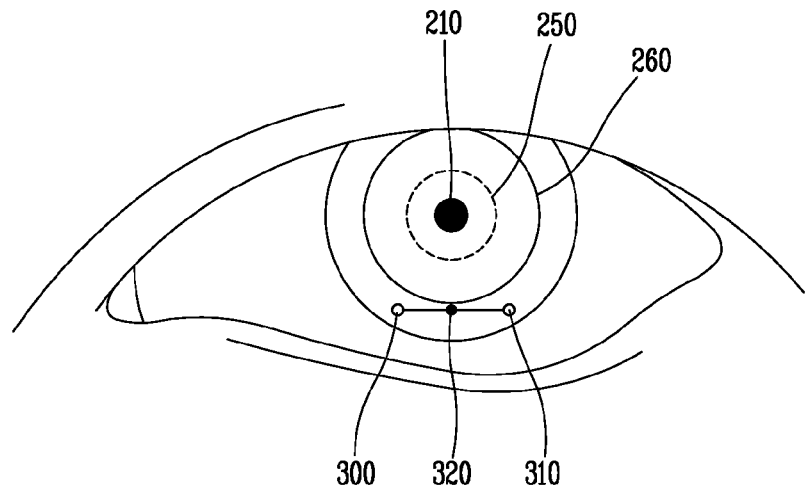
(a)
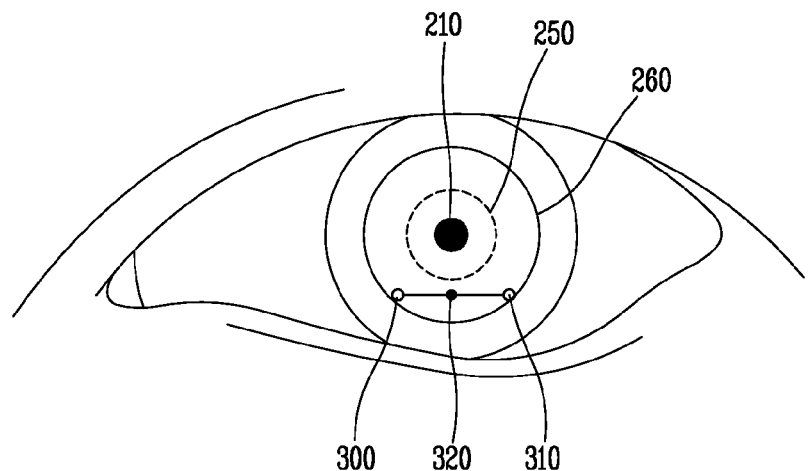
(b)
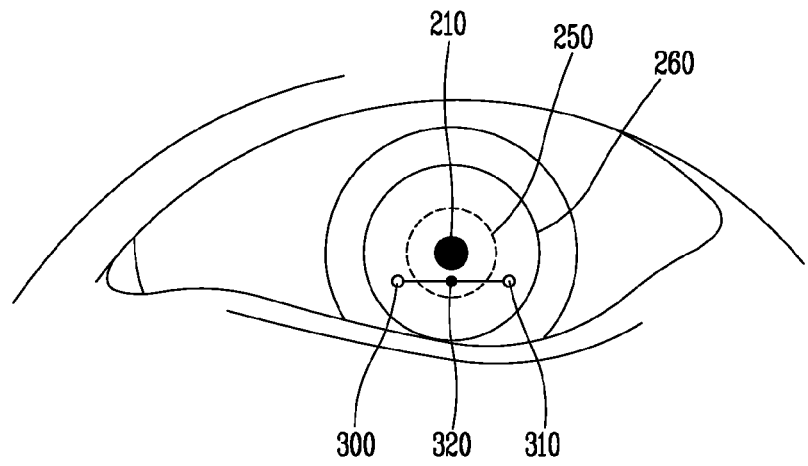
(c)

FIG. 4
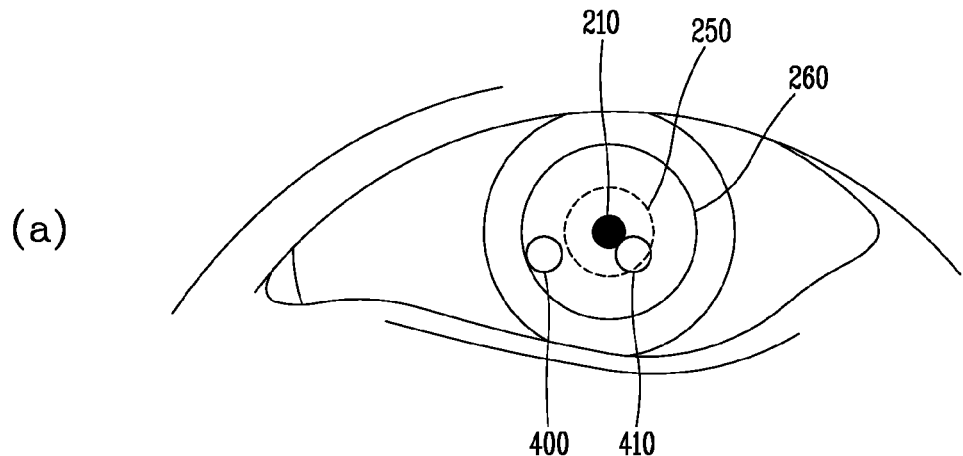
(a)
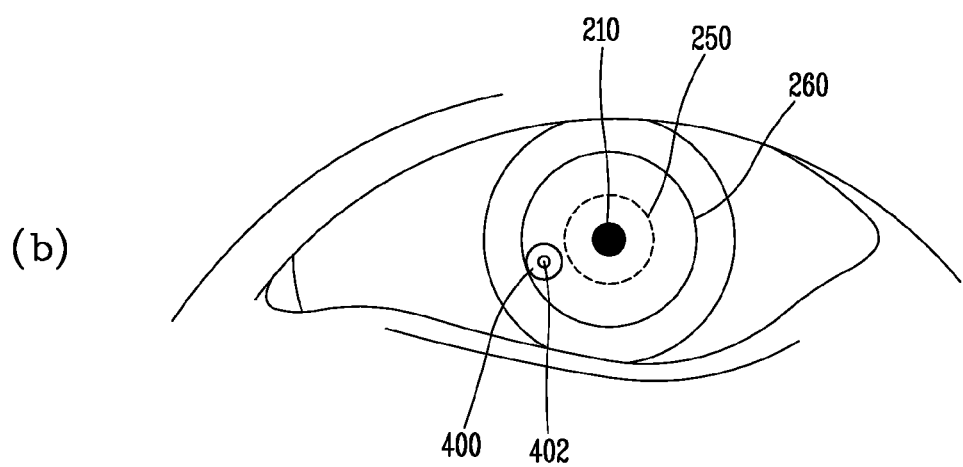
(b)
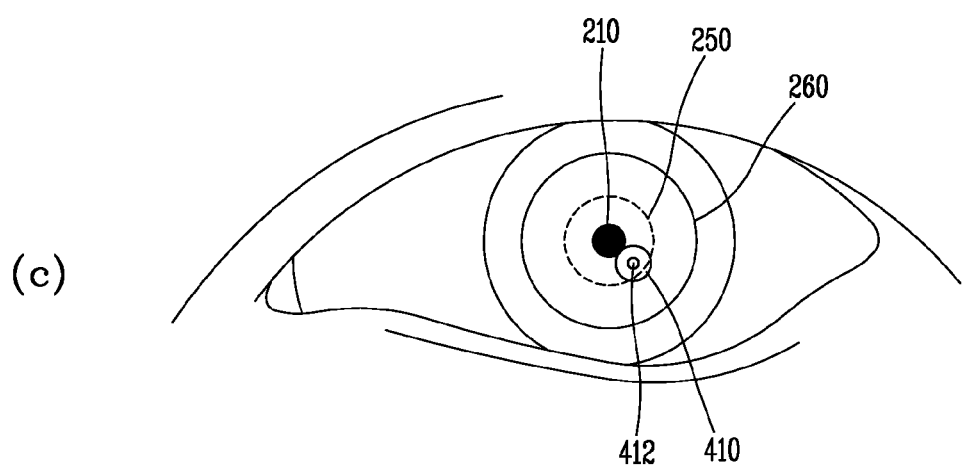
(c)

FIG. 5B
(a) 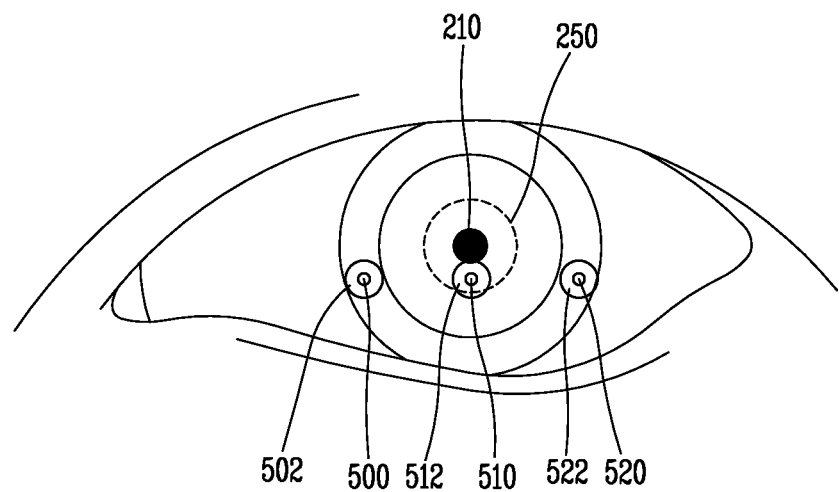
(b) 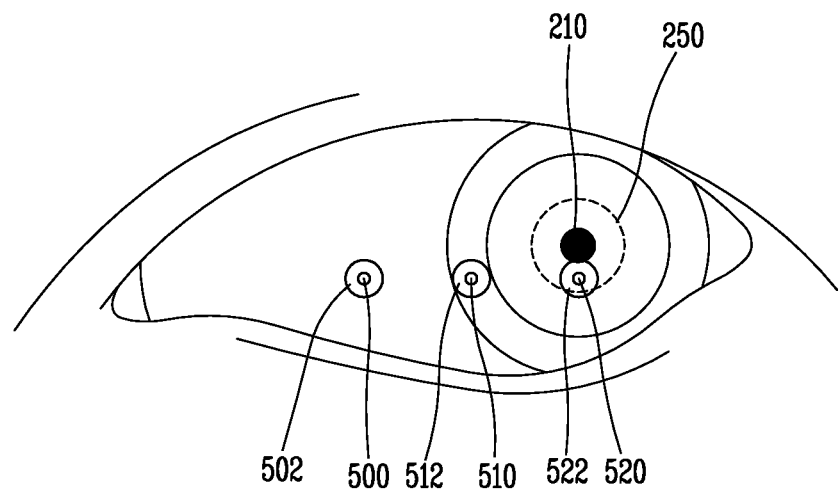

FIG. 9
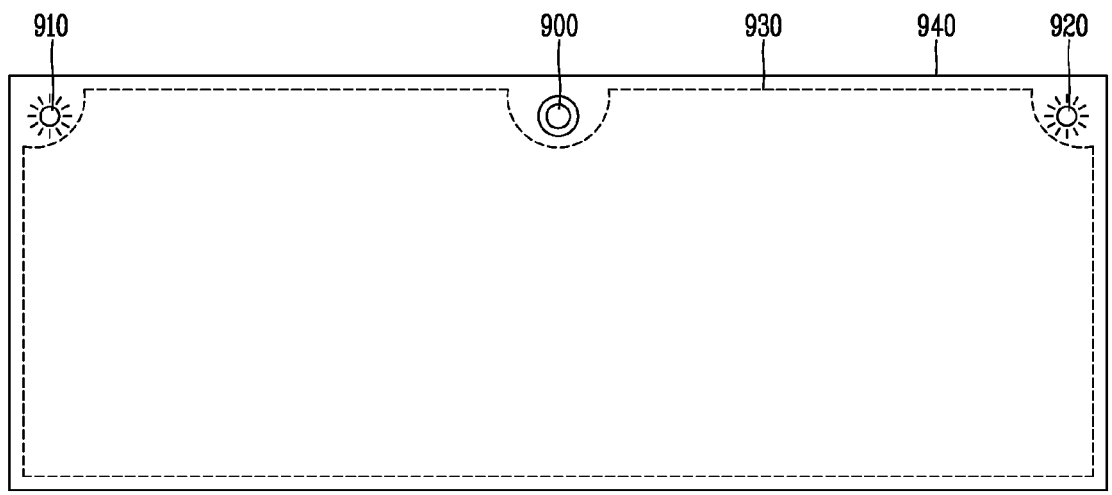
(a)
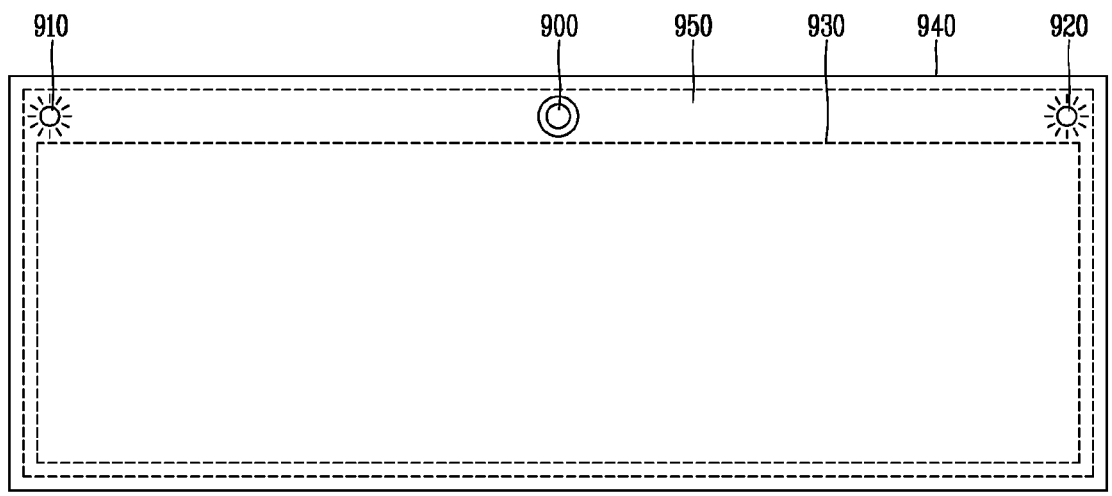
(b)

FIG. 10
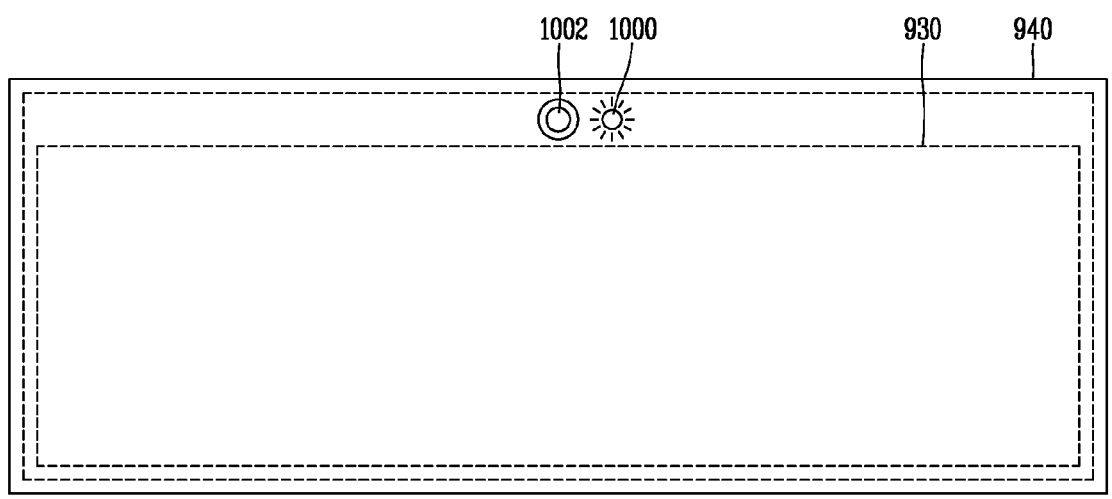
(a)
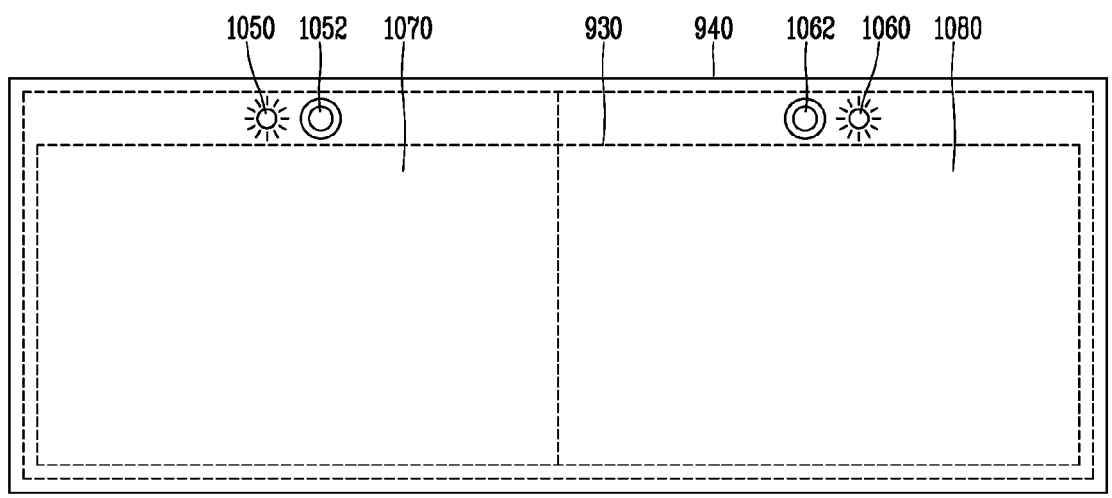
(b)

VEHICLE CONTROL APPARATUS AND METHOD THEREOF

CROSS-REFERENCE TO RELATED APPLICATIONS

This non-provisional application claims the benefit under 35 U.S.C. § 119(e) to U.S. Provisional Application No. 62/316,584, filed on Apr. 1, 2016, and under 35 U.S.C. § 119(a) to Patent Application No. 10-2016-0093636, filed in Republic of Korea on Jul. 22, 2016, all of which are hereby expressly incorporated by reference into the present application.

BACKGROUND OF THE INVENTION

1. Field of the Invention

The present disclosure relates to an apparatus for controlling a vehicle according to a user's line of sight and a control method thereof.

2. Description of the Related Art

Current vehicle control technologies provide various functions to a user. Accordingly, a large number of keys or buttons for driving various functions are provided on the current vehicle. As a result, complicated control environments for controlling the various functions are formed on a current vehicle, and thus a driver has difficulties in controlling the functions. When such a plurality of keys are simplified, a larger number of functions should match one key, thereby requiring the user to perform a complicated manipulation.

Accordingly, as a method for allowing the driver to manipulate the various functions in a more convenient manner, a scheme of allowing a function to be driven according to a direction at which the driver gazes has been proposed. In such a way, functions can be controlled according to the driver's line of sight, thereby allowing various functions of the vehicle to be performed without having a plurality of keys or any driver's complicated manipulation.

Further, in order to allow various functions to be performed using such a driver's line of sight, it is important to accurately detect the coordinate of a direction in which the driver gazes. For the purpose of this, a current vehicle requires its driver to perform calibration for correcting an error between a coordinate according to the driver's gaze direction and a coordinate corresponding to a direction in which the driver is actually gazing. In this instance, a current vehicle requests the driver to gaze at a previously recognized specific point for the calibration and requests the driver to explicitly enter whether or not he or she gazes at the specific point. This is because the vehicle cannot determine whether or not the driver gazes at the specific point by itself.

Further, such calibration may be often requested while the driver uses the vehicle. This is because the direction and position in which the driver's head faces may often vary according to a posture taken by the driver or the movement or habit of the driver, and the like. However, as described above, the process of calibration may be performed on a current vehicle only when calibration itself is requested to the driver, and calibration may be performed when the driver applies an explicit input.

Moreover, in the position of the driver who should keep an eye on the surrounding circumstances in a concentrated manner, it may be extremely dangerous to disperse his or her gaze for the calibration process while driving. Accordingly, there are a lot of restrictions in frequently performing the calibration process for correcting an error according to a driver's gaze direction on a current vehicle.

SUMMARY OF THE INVENTION

An object of the present disclosure is to solve the foregoing and other problems.

Another object of the present disclosure is to provide a vehicle control apparatus for allowing a driver to perform calibration capable of correcting the driver's gaze direction without dispersing his or her gaze for the calibration and a control method thereof.

Still another object of the present disclosure is to provide a vehicle control apparatus for performing calibration without additionally requesting a driver to apply an input according to the calibration or receiving an additional input for the calibration from the driver and a control method thereof.

In order to accomplish the foregoing and other objects, according to an aspect of the present disclosure, there is disclosed a vehicle control apparatus for controlling various functions of a vehicle according to a user's line-of-sight direction, and the vehicle control apparatus may include a display unit configured to display various image information associated with the vehicle, a light source unit comprising at least one light source configured to emit light so as to form at least one reflected light in one region of the user's pupil and eyeball when the user gazes at one region on the display unit, a memory configured to store coordinate information on each region within the vehicle and the at least one light source, respectively, a camera unit comprising a camera configured to sense an image including one region of the user's pupil and eyeball, and a controller configured to calculate a first coordinate from the center of the user's pupil and calculate a second coordinate from at least one reflected light included in the image based on the sensed image, and calculate a coordinate of one point within the vehicle as a reference coordinate from prestored coordinate information of at least one light source, respectively, that have formed the at least one reflected light when a distance between the first coordinate and the second coordinate is less than a preset distance, and perform calibration on the reference coordinate for a coordinate corresponding to a direction in which the driver gazes.

In order to accomplish the foregoing and other objects, according to an aspect of the present disclosure, there is disclosed a control method of a vehicle control apparatus for controlling various functions of a vehicle according to a user's line-of-sight direction, and the method may include sensing an image of the user's eye that gazes at one region on the display unit of the vehicle provided with at least one light source, detecting the user's pupil region and at least one reflected light region on which light emitted from the light source is reflected and formed, from the sensed image, calculating a first coordinate from the center of the pupil region and calculating a second coordinate from the center of the at least one reflected light region, respectively, determining whether or not the user gazes at one region on the display unit based on a separated distance between the calculated first and second coordinates, and calibrating the user's line-of-sight direction coordinate calculated by the center of the user's pupil and prestored human modelling data based on a coordinate value of the at least one light source when it is determined that the user gazes at one region on the display unit as a result of the determination, wherein one region on the display unit is a region that displays information associated with the driving of the vehicle.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2B is a conceptual view illustrating the center coordinate of a center coordinate pupil of a glint in the vehicle control apparatus according to an embodiment of the present disclosure;

FIG. 3B is a conceptual view illustrating an example in which whether or not the user gazes at traveling information is determined based on the coordinate information generated in FIG. 3A and the center coordinate of pupil;

FIG. 4 is a conceptual view illustrating that glints formed from a plurality of light sources, respectively, are recognized in a distinguished manner using a plurality of cameras;

FIG. 5B is a conceptual view illustrating an example of sensing a user's line of sight gazing at one region on the display unit corresponding to any one of the glints according to the foregoing process described in FIG. 5A;

FIGS. 9 and 10 are views illustrating examples in which at least one light source and at least one camera are formed around a region of the display unit in a vehicle control apparatus according to an embodiment of the present disclosure;

DETAILED DESCRIPTION OF THE EMBODIMENTS

Figure 1:
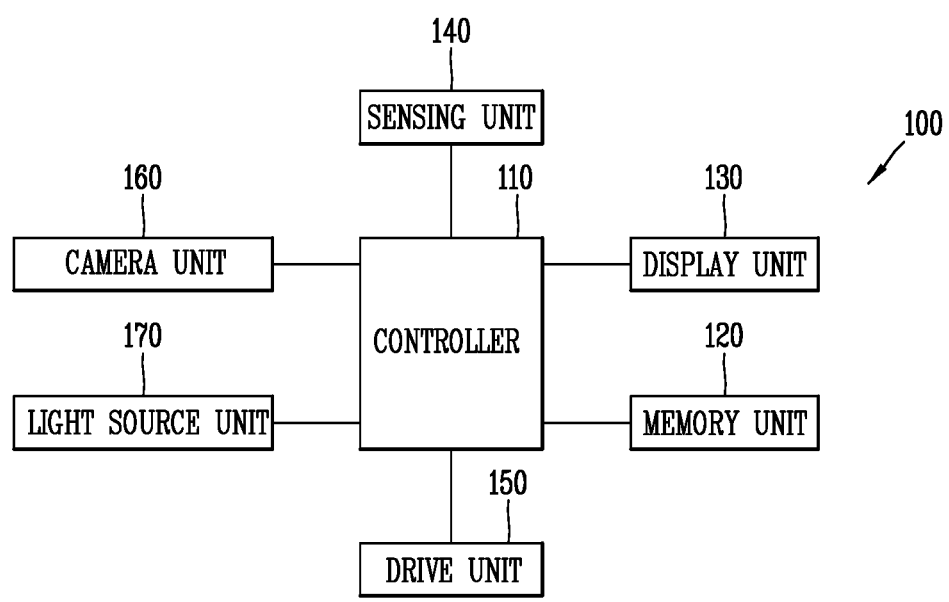
FIG. 1 is a block diagram illustrating a vehicle control apparatus according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes included in the concept and technological scope of the invention.

FIG. 1 is a block diagram illustrating a vehicle control apparatus 100 according to an embodiment of the present disclosure. As illustrated in FIG. 1, the vehicle control apparatus 100 includes a controller 110, and a memory unit 120, a sensing unit 140, a drive unit 150, a camera unit 160, a light source unit 170, and a display unit 130 connected to the controller 110.

The display unit 130 can display a sensing result of the sensing unit 140, information associated with the operation of a vehicle, and various information received from an outside of the vehicle in the form of image information. The display unit 130 can be formed in an interlayer structure or integrally formed with a touch sensor to implement a touch screen. Such a touch screen can provide an output interface between the vehicle control apparatus 100 and a user as well as serving as a user input unit for providing an input interface between the vehicle control apparatus 100 and the user.

Here, the display unit 130 can be implemented at various portions of a vehicle. For example, the display unit 130 can be formed on a cluster or formed on an entire or part of a windshield glass of the vehicle. The display unit 130 can also be implemented on the driver's seat side window, a passenger seat side window, a vehicle rear seat window, or the like.

The memory unit 120 stores data supporting various functions of the vehicle control apparatus 100, a plurality of application programs or applications driven on the vehicle control apparatus 100, data for the operation of the vehicle control apparatus 100, commands, and the like. Furthermore, the memory unit 120 can store various programs for the operation of the controller 110, and temporarily store input/output data. At least part of the application programs may be downloaded from an external server through wireless communication. Furthermore, at least part of those application programs may exist on the vehicle control apparatus 100 at the time of factory shipment for basic functions (for example, a start function, a navigation function, etc.). In addition, the application programs may be stored in the memory unit 120, installed on the vehicle control apparatus 100, and driven by the controller 110 to perform the operation (or function) of the vehicle control apparatus.

Further, the memory unit 120 can store various information for executing the driving of the vehicle and at least one of various functions that can be provided by the vehicle according to a direction in which the user gazes. For example, the memory unit 120 can store coordinate information corresponding to each region within the vehicle to recognize each region within the vehicle corresponding to the direction in which the user gazes.

In addition, the memory unit 120 can store information associated with at least one or more users. Here, user-related information may be information that has recognized a specific user or the like. For example, when voice is entered from a user, the controller 110 can recognize the user who utters the voice. When there are a plurality of vehicle passengers, the controller 110 can distinguish the passengers using the recognized results. In this instance, information for distinguishing the passengers or the like can be stored in the memory unit 120. Furthermore, the memory unit 120 can also include the recognized line-of-sight setting information corresponding to each user.

In particular, the line-of-sight setting information includes calibration information according to a user's posture, a height of his or her head and the like when each user sits in the driver's seat in the vehicle. In other words, when a user changes is recognized, the vehicle control apparatus 100 according to an embodiment of the present disclosure can initialize information on the user's line of sight corresponding to at least one preset reference coordinate within the vehicle based on preset line-of-sight setting information, namely, calibration information, for the recognized user. Accordingly, even when the user is changed, the user's desired function can be selected and executed according to the user's line of sight.

The memory unit 120 also includes at least one type of storage medium among a flash memory type, a hard disk type, a solid state disk (SSD) type, a silicon disk drive (SDD) type, a multimedia card micro type, a card type memory (for example, SD, DX memory, etc.), random access memory (RAM), static random access memory (SRAM), read-only memory (ROM), electrically erasable programmable read-only memory (EEPROM), programmable read-only memory (PROM), magnetic memory, magnetic disk, and optical disk. Furthermore, the vehicle control apparatus 100 can be operated in connection with a web storage performing a storage function of the memory unit 120 on the Internet.

In addition, the sensing unit 140 includes at least one sensor for sensing at least one of surrounding environment information around a vehicle provided with the vehicle control apparatus 100 according to an embodiment of the present disclosure and user information. For example, the sensing unit 140 may include at least one of a proximity sensor, an illumination sensor, a touch sensor, an acceleration sensor, a magnetic sensor, a gravity sensor (G-sensor), a gyroscope sensor, a motion sensor, an RGB sensor, an infrared (IR) sensor, a finger scan sensor, an ultrasonic sensor, an optical sensor, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). In addition, the vehicle control apparatus 100 disclosed herein may combine and use information sensed by at least two or more sensors among those sensors.

Also, the sensing unit 140 may include at least one sensing region capable of sensing a user's input. Such a sensing region may be formed on a body portion of the vehicle including an inner frame and an outer frame of the vehicle. The sensing region may be implemented in the form of a touch screen or the like. The sensing region may be formed on various portion of the vehicle, For example, the sensing region may be implemented on an entire or part of a windshield glass of the vehicle, and may be also implemented on the driver's seat side window, a passenger seat side window, a vehicle rear seat window, or the like.

In addition, the sensing unit 140 may include a line-of-sight sensing unit capable of sensing a direction in which a user's line of sight faces. For example, the line-of-sight sensing unit may include at least one camera provided within the vehicle, and the controller 110 can sense the movement of a user's pupil through a camera provided in the line-of-sight sensing unit. Furthermore, the controller 110 can calculate a position of one point within the vehicle at which the user gazes based on a direction in which the user's pupil faces.

The drive unit 150 can perform at least one function provided within the vehicle according to the control of the controller 110. For example, the drive unit 150 can perform various function associated with the driving of the vehicle such as starting, driving, and stopping of the vehicle according to a user's input.

Further, the controller 110 controls the overall operation of the vehicle control apparatus 100 and can control the entire operation of various functions provided by the vehicle as well as the driving of the vehicle. For example, the controller 110 can control the driving of the vehicle by processing a signal, data, information and the like input or output from the sensing unit 140 or the user or driving an application program stored in the memory unit 120. The controller 110 can also control at least part of the constituent elements described along with FIG. 1 to drive an application program stored in the memory unit 120. Moreover, the controller 110 can operate at least two or more of the constituent elements in combination with each other.

The controller 110 can also control the sensing unit 140 to sense a direction in which a user gazes. Furthermore, the controller 110 can control the drive unit 150 to perform operations associated with the traveling of the vehicle and at least one function that can be provided by the vehicle according to a result of the sensing. Accordingly, when the user gazes at a specific point within the vehicle, the controller 110 can sense it and perform various functions corresponding to the sensed point through the drive unit 150.

For example, when the user looks at a driver's seat side window, the controller 110 can perform a function of opening or closing the driver's seat side window. Alternatively, when the user gazes at the driver's seat side window, the controller 110 can determine that the driver's seat side window is selected by the user, and control a currently selected constituent element, namely, the driver's seat side window, based on a subsequently applied additional input. Here, the additional input may be a user's voice command or a preset key input.

Further, the vehicle control apparatus 100 according to an embodiment of the present disclosure can further include the camera unit 160, the light source unit 170 configured to perform calibration for reducing an error between the coordinate of one point within the vehicle according to a result of sensing the user' line of sight, and a specific point within the vehicle at which the user actually gazes, in addition to the foregoing constituent elements to execute various functions according to the user's line-of-sight direction.

The camera unit 160 includes at least one camera for sensing a user's eye image. The at least one camera included in the camera unit 160 can sense a user's eye image, and the user's pupil and glint may be included in the user's eye image. Here, the glint denotes reflected light that is reflected from the user's eyeball and cornea exposed between the user's eyelids. In other words, the glint is the reflected light of a specific light source reflected on the user's eye or a partial image of the vehicle interior.

Further, the light source unit 170 includes at least one light source capable of emitting light having a preset wavelength. Light emitted from the at least one light source is reflected on the user's eyeball and pupil exposed between the user's eyelids to form the glint. In other words, light emitted from at least one light source included in the light source unit 170 can be reflected on the user's eye to form the glint, and at least one camera included in the camera unit 160 can sense the user's eye image formed by the glint. Here, at least one light source included in the light source unit 170 can also be formed to generate light having a wavelength above a preset length not to have a glare to the user or a harmful effect on eye health.

The controller 110 can also perform the calibration based on the sensed eye image. In other words, the controller 110 can calculate a center coordinate from a glint detected from the sensed eye image, and calculate a center coordinate from the user's pupil detected from the eye image. When a distance between the center coordinate of the glint and the center coordinate of the pupil is less than a preset distance, the controller 110 can determine that a user currently gazes at a light source corresponding to the detected glint. Then, the controller 110 can perform calibration based on the coordinate of the light source corresponding to the detected glint. Here, the coordinate of the light source corresponding to the glint may be prestored in the memory unit 120. Accordingly, the controller 110 can sense that the user gazes at a preset reference coordinate point (the coordinate of a light source corresponding to the detected glint) even though the user does not additionally apply an explicit input.

The controller 110 can also calculate a coordinate corresponding to a direction at which a user gazes based on a pupil detected from the sensed eye image, the user's eye height, and a direction in which the user's head faces. For example, the controller 110 can calculate a center coordinate of an eyeball formed at a position corresponding to a current user's eye height and a direction in which his or her head faces, based on a prestored eyeball 3D model of a human body. Furthermore, the controller 110 can calculate a coordinate of one point within the vehicle corresponding to a central direction of the user's eyeball based on a straight line connected between the calculated eyeball center coordinate and the pupil center coordinate. The coordinate of one point within the vehicle corresponding to the calculated coordinate can be a coordinate of one point in a direction in which the user gazes, namely, a coordinate of the calculated line-of-sight direction.

When the calibration is performed, the controller 110 can compare a coordinate of the calculated line-of-sight direction with a coordinate of a light source corresponding to the glint. Furthermore, the controller 110 can compensate the coordinate of the calculated line-of-sight direction based on the coordinate of the light source corresponding to the glint. Accordingly, an error between the coordinate of one point calculated according to a direction at which the user gazes and the coordinate corresponding to a direction at which the user actually gazes may decrease, thereby detecting a more accurate coordinate of one point within the vehicle according to a direction in which the user gazes.

The at least one light source may be formed on at least one point on the display unit 130. For example, the at least one light source may be formed in one region on the display unit 130 displayed with screen information at which the user frequently gazes or formed adjacent to the one region. The screen information at which the user frequently gazes may be information associated with the running information of the vehicle such as traveling information. In other words, the at least one light source may be formed in one region on the display unit 130 displayed with traveling information, and in this instance, the controller 110 can perform the calibration process whenever the user gazes at the traveling information, thereby more frequently performing the calibration process.

As described above, the vehicle control apparatus 100 according to an embodiment of the present disclosure can sense whether or not the user gazes at a point corresponding to a preset reference coordinate (a point formed with a light source). Accordingly, when the light source is formed in one region on the display unit 130 displayed with traveling information, the controller 110 can sense that the user looks at the traveling information, and immediately perform a calibration process even without the additional input when the user gazes at the displayed traveling information. Therefore, when the user gazes at traveling information, the present disclosure can prevent the user from being aware of the calibration.

Hereinafter, embodiments associated with a control method implemented in the vehicle control apparatus 100 having the foregoing configuration will be described with reference to the accompanying drawings. It should be understood by those skilled in the art that the present disclosure can be embodied in other specific forms without departing from the concept and essential characteristics thereof. In addition, at least part of the constituent elements may operate in cooperation with each other to implement an operation control or control method of the vehicle control apparatus 100 according to various embodiments described below. The operation control or control method of the vehicle control apparatus 100 can be implemented on the vehicle control apparatus 100 by the driving or execution of at least one application program stored in the memory unit 120.

Figure 2A:
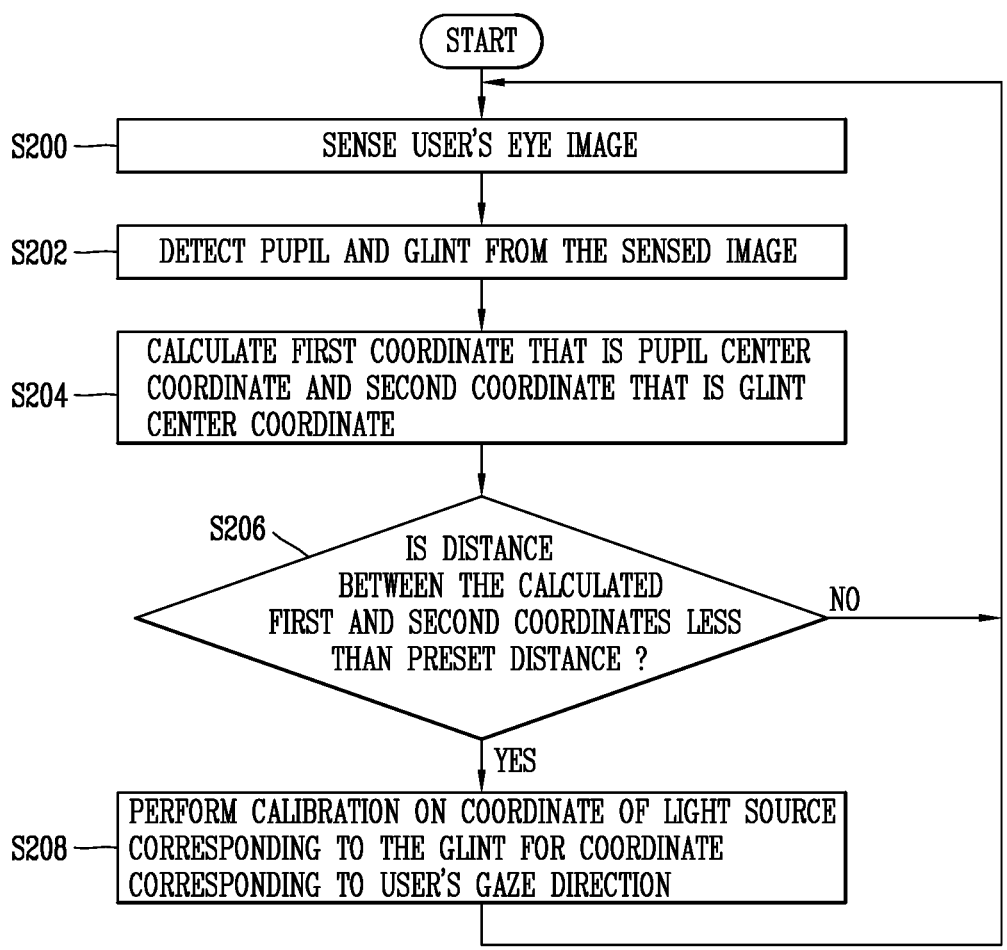
FIG. 2A is a flow chart illustrating an operation process of automatically performing calibration in a vehicle control apparatus according to an embodiment of the present disclosure and a conceptual view illustrating the same.

FIG. 2A is a flow chart illustrating an operation process of automatically performing calibration in the vehicle control apparatus 100 according to an embodiment of the present disclosure. Furthermore, FIG. 2B is a conceptual view illustrating the center coordinate of a center coordinate pupil of a glint in the vehicle control apparatus 100 according to an embodiment of the present disclosure.

First, referring to FIG. 2A, the controller 110 of the vehicle control apparatus 100 activates at least one light source included in the light source unit 170 and at least one camera included in the camera unit 160. For example, the driving of the vehicle may denote the time when the vehicle starts. In other words, when the vehicle starts, the vehicle control apparatus 100 can be switched from a power-off state to a power-on state. Furthermore, the vehicle control apparatus 100 can sense the user's eye image through at least one camera provided in the camera unit 160 (S200). Here, the user can be a person sitting on a driver's seat, and thus the at least one camera is to acquire an image of an eye portion of the person sitting on the driver's seat.

When the user's eye image is acquired in the step S200, the controller 110 can detect a region corresponding to the user's pupil and a region corresponding to a glint formed by a light source of the light source unit 170 from the sensed image (S202). Furthermore, the controller 110 can calculate a first coordinate that is a center coordinate of the pupil region from the detected pupil region and the glint region, and calculate a second coordinate that is a center coordinate of the glint region from the glint region (S204).

When the first coordinate that is a center coordinate of the pupil and a second coordinate that is a center coordinate of the glint are calculated in the step S204, the controller 110 can calculate a distance between the first coordinate and the second coordinate. Furthermore, the controller 110 can compare the calculated distance with a preset distance to determine whether or not the center coordinate of the glint (second coordinate) is located within a preset distance from the center of the pupil (first coordinate) (S206).

Here, the preset distance can be determined according to various methods. For example, the preset distance may be one according to a tolerance range determined through various experiments. Accordingly, even when a user does not directly gaze a region formed with the light source or gazes at any point within one region on the display unit 130 displayed with specific image information such as the traveling information, the controller 110 can determine that the user gazes at a predefined region, namely, a region formed with the light source.

The preset distance may be determined in consideration of a user's kappa angle. Here, the kappa angle denotes an angle formed at a vertex of pupil between a line of vision from the center of pupil to an object on which a user keeps an eye and an optical axis connecting the center of pupil to the center of the user's eyeball (for example, eyeball rotation point). Accordingly, a coordinate of one point according to an optical axis calculated from the center of pupil and the center of eyeball (rotation point) sensed through the camera and a coordinate of a point according to a gaze direction at which a user actually looks, namely, a coordinate of a point according to a direction in which a line of vision faces may be different from each other.

Accordingly, the present disclosure can form a region within a preset distance from the center of the pupil (first coordinate) in consideration of the kappa angle. For example, the present disclosure can receive a kappa angle from a user, and accordingly set a region within the preset distance upon receiving a kappa angle. When the center of the glint (second coordinate) is located in the formed region, the controller 110 can determine that the user gazes a light source corresponding to the glint.

Next, FIG. 2B is a view illustrating examples in which a user's eye image including a glint is sensed. First, when an eye image as illustrated in FIG. 2B(a) is sensed, the controller 110 can calculate a center coordinate 210 of pupil 240 as a first coordinate from the sensed image. In addition, the controller 110 can calculate a center coordinate 220 of a glint as a second coordinate from the glint 230 included in the sensed eye image. The controller 110 can also determine a critical region 250 that is a region in which a distance separated from the first coordinate is less than a preset distance.

Thus, when the first coordinate 210 and second coordinate 220 are calculated, and the critical region 250 is determined, the controller 110 can detect whether or not the second coordinate 220 is located within the critical region 250. For example, as illustrated in FIG. 2B(a), when the second coordinate 220 is not located within the critical region 250, the controller 110 can determine that a user does not gaze at a light source corresponding to the glint 230 in the step S206.

When the controller 110 determines that the user does not currently gaze at a region formed with a light source according to a determination result in the step S206, the controller 110 can proceed to the step S200 to sense the user's eye image. The controller 110 can repeat the steps S200 through S206 to determine whether or not the user currently gazes at a region formed with a light source.

As illustrated in FIG. 2B, when the second coordinate 220 is located within the critical region 250, the controller 110 can determine that the glint 230 is formed within a preset distance from the user's pupil center 210. Accordingly, the controller 110 can determine that the user gazes at a region formed with a light source corresponding to the glint 230.

In the step S208, a coordinate of a region formed with the light source may be used as a reference coordinate for the calibration. Here, the coordinate information of a region formed with the light source may be information that has been previously calculated and stored in the memory unit 120. In other words, the controller 110 can sense that the user looks at a predefined specific point (region formed with the light source) when the center coordinate 220 of the user's glint 230 is within a preset distance from the center coordinate 210 of pupil 240 as a result of the determination in the step S206 even though there is no explicit additional input. Accordingly, the controller 110 can correct the coordinate of the predefined specific point as the coordinate of a point according to a result of calculating a direction in which the user currently gazes.

When the calibration is completed in the step S208, the controller can proceed to the step S200 to sense the user's eye image. Furthermore, the controller 110 can repeat the steps S202 through S206 to determine whether or not the user currently gazes at a region formed with a light source, and perform recalibration again in the step S208 according to the result.

In addition, the present disclosure has been described that the light source can be formed in one region on the display unit 130 at which the user frequently gazes to perform the calibration process when the user is not conscious of it. Also, one region on the display unit 130 at which the user frequently gazes may be a region displayed with key information associated with the running of the vehicle such as traveling information. Furthermore, the present disclosure can determine that the user gazes at a region provided with a light source corresponding to the glint according to a distance between the center coordinate of glint and the center coordinate of pupil as described above, and thus does not demand an additional input to the user. Accordingly, the present disclosure can perform the calibration process when the user gazes at traveling information when the vehicle is traveling.

FIG. 2B illustrates the user merely gazes at a light source corresponding to the glint based on coordinate information calculated from a glint formed on the user's one eye and coordinate information calculated from the pupil as an example, but the vehicle control apparatus 100 according to an embodiment of the present disclosure can determine whether or not the user gazes a light source corresponding to the glint using both of his or her eye images.

For example, the user's eye image acquired in the step S200 can be both of the user's eye images. In this instance, the controller 110 can calculate separation distances between the center coordinate of glints and the center coordinate of pupils formed on both eyes from the acquired both eye images. Furthermore, the controller 110 can determine that the user gazes at a light source corresponding to the glint according to at least one of the separation distances calculated from the both eyes, respectively. In other words, the controller 110 can determine that the user gazes at a light source corresponding to the glint even when only either one of the calculated separation distances is less than the preset distance.

In addition, the controller 110 can determine that the user gazes at a light source corresponding to the glint only when both separation distances calculated from both eyes, respectively, are less than a preset distance. This is because the positions of glints viewed on the user's both eyes can slightly vary according to the user's posture (for example, a direction in which his or her head faces). This may also be because directions at which both eyes gaze may not be in parallel to each other according to the user's eye characteristics. Accordingly, the controller 110 can determine that the user gazes at a light source corresponding to the glint only when both centers of each glint viewed on the both eyes from the center of each pupil of the both eyes are less than a preset distance.

The foregoing description describes that one light source is provided in one region on the display unit 130 displayed with the traveling information to determine whether or not the user gazes at the traveling information based on a glint formed from the light source, but this is merely an embodiment of the present disclosure, and the present disclosure is not limited to this. In other words, a plurality of light source may be provided on the display unit 130 displayed with the traveling information. Also, when a plurality of light sources are provided as described above, the controller 110 can calculate coordinate information to be compared with the center coordinate of the pupil according to positional relations between a plurality of glints formed from the plurality of light sources, respectively.

Figure 3A:
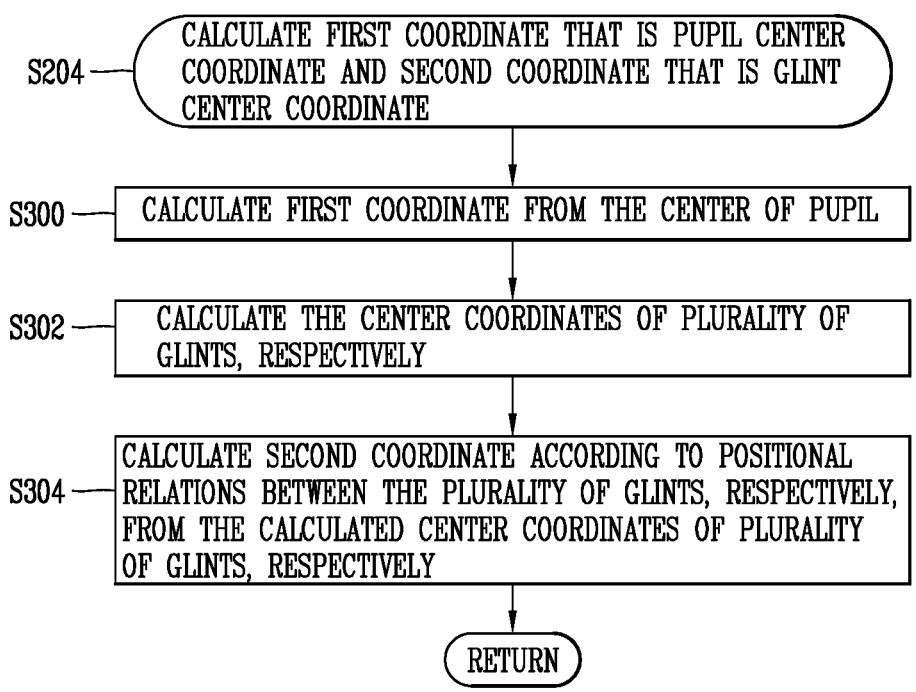
FIG. 3A is a flow chart illustrating an operation process of generating coordinate information based on glints formed from a plurality of light sources in a vehicle control apparatus according to an embodiment of the present disclosure and conceptual views.

Next, FIG. 3A is a flow chart illustrating an operation process in which coordinate information to be compared with the center coordinate of the pupil is generated based on glints formed from a plurality of light sources in the vehicle control apparatus 100 according to an embodiment of the present disclosure. Furthermore, FIG. 3B is a conceptual view illustrating an example in which whether or not the user gazes at traveling information is determined based on the coordinate information generated in FIG. 3A and the center coordinate of pupil.

First, referring to FIG. 3A, the controller 110 can detect a plurality of glints included in the user's eye image in the steps S200 through S202. Furthermore, the controller 110 can detect a pupil region included in the user's eye image. In this state, the controller 110 can calculate the center coordinate of the detected pupil region (S300). Furthermore, the controller 110 can calculate the center coordinates of each glint from the plurality of glints, respectively (S302).

In addition, when center coordinates are calculated from the plurality of glints, respectively, the controller 110 can calculate the center coordinate of pupil, namely, coordinate information to be compared with a first coordinate, namely, a second coordinate. For example, the controller 110 can generate a straight line connecting the center coordinates of glints to each other or generate a polygon having the center coordinates of the glints as vertices. A coordinate corresponding to the center of the generated straight line or polygon may be calculated as the second coordinate to be compared with the first coordinate. When the second coordinate is calculated, the controller 110 can proceed to the step of S206 in FIG. 2A to determine whether or not the user gazes at the preset specific point, namely, a region formed with the plurality of light sources, according to a distance between the first and the second coordinate.

FIG. 3B is a view illustrating an example of a plurality of glints, as described above, and a second coordinate calculated from the center coordinates of the glints, and an example of determining that the user gazes at a region corresponding to the glints according to a separation distance between the second coordinate and the first coordinate.

In particular, FIG. 3B(a) illustrates an example of glint center coordinates 300, 310 calculated from two glints. When an eye image as illustrated in FIG. 3B(a) is sensed, the controller 110 can generate a virtual straight line connecting the glint center coordinates 300, 310, and calculate the center coordinate of the generated straight line as the second coordinate. The controller 110 can determine whether or not the user gazes at a region formed with the two glints according to a distance between a first coordinate 210 that is the center coordinate of pupil 260 and the calculated second coordinate 320 through the step S206 in FIG. 2. As illustrated in FIG. 3B(a), when the first coordinate 210 and the second coordinate 320 exceeds a preset distance, the controller 110 can determine that the user does not gaze at a region formed with the two glints. Then, the controller 110 can proceed to the step S200 in FIG. 2 again to sense the user's eye image again.

Next, FIG. 3B(b) illustrates an eye image sensed again, and an example in which the user looks at a slightly lower direction in a state shown in FIG. 3B(a). In this instance, the controller 110 can determine whether or not the user gazes at a region formed with the two glints through the processes illustrated in the above FIG. 3A and the process S206 in the above FIG. 2. Accordingly, as illustrated in FIG. 3B(b), when a distance between the first coordinate 210 and the second coordinate 320 exceeds a preset distance, the controller 110 can determine that the user does not gaze at a region formed with the two glints. Then, the controller 110 can proceed to the step of S200 again to sense the user's eye image again.

FIG. 3B(c) illustrates an eye image sensed again, and an example in which the user looks at a further lower direction in a state shown in FIG. 3B(b). Thus, when the user gazes at a further lower direction, the center of pupil 260 (first coordinate 210) moves in a further downward direction as illustrated in FIG. 3B(c). As illustrated in FIG. 3B(c), when the second coordinate 320 calculated from a straight line connecting the center of the pupil 260 (first coordinate 210) to the center coordinates 300, 310 of each glint is within a preset distance, the controller 110 can determine that the user gazes at a region formed with the glints in the step of S206 in FIG. 2. Then, the controller 110 can calculate a reference coordinate from the coordinates of light sources corresponding to the glints in the step of S208, and perform calibration based on the calculated reference coordinate.

When a plurality of glints are formed from a plurality of light sources as described above, the reference coordinate can be a coordinate calculated according to positional relations between the plurality of light sources. In other words, the controller 110 can generate a straight line connecting the coordinates of the plurality of light sources, respectively, to each other or generate a polygon having the coordinates of the plurality of light sources, respectively, as vertices. The controller 110 can calculate a coordinate corresponding to the center of the generated straight line or polygon as a reference coordinate. Here, the coordinate of the plurality of light sources, respectively, may be previously investigated or calculated, and previously stored in the memory unit 120.

Therefore, when it is detected that a second coordinate generated from two glints is located at a preset distance from a first coordinate that is the center of the pupil as illustrated in FIG. 3B(c), the controller 110 can determine that the user looks at the center of a straight line connecting the coordinates of light sources corresponding to the two glints, respectively. Accordingly, the controller 110 can read the coordinate information of light sources corresponding to the glints, respectively, from the memory unit 120, and calculate the center coordinate of a virtual straight line connecting the read coordinate information, and perform the calibration using the coordinate of the calculated point as a reference coordinate.

The foregoing description in FIGS. 2A through 3B has described that at least one light source is provided in one region on the display unit 130, and whether or not the user gazes at the one region based on at least one glint formed from the at least one light source is determined. However, one or a plurality of regions on the display unit 130 can be provided with the at least one light source. In this instance, when the user gazes at each different region on the display unit 130, the controller 110 can compare a coordinate calculated according to a direction at which the user gazes and a coordinate of at least one light source provided in the relevant region to perform calibration. Accordingly, the present disclosure can perform compensation, namely, calibration, of a coordinate value calculated according to a direction at which the user gazes even for another direction as well as for a specific direction (for example, the front). In addition, compensation for a plurality of different directions can be performed.

When at least one light source is provided in a plurality of different regions on the display unit 130, the camera unit 160 can include a plurality of cameras corresponding to light sources, respectively, provided in each region on the display unit 130 as described above. In this instance, each camera cancan correspond to a light source provided in a specific region of the display unit 130, and determine whether or not a glint formed from the sensed eye image is formed from the corresponding light source.

In other words, light sources provided in each region on the display unit 130 can be a light source emitting light having different wavelengths, respectively, or blinking at different frequencies, respectively. A camera corresponding to each light source can detect only light source having a specific wavelength or detect only light source blinking at a specific frequency. Accordingly, each camera can identify and detect only a glint formed from the corresponding light source from a plurality of glints included in the user's eye image.

Next, FIG. 4 is a conceptual view illustrating that glints formed from a plurality of light sources are recognized in a distinguished manner using a plurality of cameras in the vehicle control apparatus 100 according to an embodiment of the present disclosure in such a case. In particular, FIG. 4(a) illustrates an example of an eye image including glints formed from different light sources. In other words, in FIG. 4(a), a first glint 400 may be a glint formed from a first light source provided in a first region on the display unit 130, and a second glint 410 may be a glint formed from a second light source provided in a second region on the display unit 130. Furthermore, the first and the second light source may be light sources having different blinking frequencies or different wavelengths from each other.

Also, the eye image may be sensed on a first camera corresponding to the first light source and a second camera corresponding to the second light source at the same time. For example, the first camera can be provided in a first region on the display unit 130, and a second camera can be provided in a second region on the display unit 130.

In this state, the first and the second camera can detect only glints formed from the corresponding light sources from the sensed eye image. This is because the glint is formed by reflecting light emitted from a light source on a user's exposed pupil and eyeball portion, and thus has the characteristics of light emitted from each light source as it is.

Accordingly, the first camera can detect only the first glint 400 formed from a first light source and the second camera can detect only the second glint 410 formed from a second light source. FIGS. 4(b) and 4(c) illustrate an example of detecting only the first glint 400 or second glint 410 in a distinguished manner as described above.

First, referring to FIG. 4(b), the first camera can calculate a first glint center coordinate 402 from the detected first glint 400. Then, the first camera can check whether or not the calculated first glint center coordinate 402 is located within a preset distance from the first coordinate 210 calculated from the center of pupil 260. Accordingly, as illustrated in FIG. 4(b), when the position of the first glint center coordinate 402 is not located within a preset distance from the first coordinate 210, the controller 110 can determine that the user does not gaze at a first region on the display unit 130.

Referring to FIG. 4(c), the second camera can calculate a second glint center coordinate 412 from the detected second glint 410. Then, the first camera can check whether or not the calculated second glint center coordinate 412 is located within a preset distance from the first coordinate 210 calculated from the center of pupil. As illustrated in FIG. 4C, when the position of the second glint center coordinate 412 is not located within a preset distance from the first coordinate 210, the controller 110 can determine that the user does not gaze at a second region on the display unit 130. Then, the controller 110 can perform calibration for a user's line-of-sight direction gazing at the second region based on prestored coordinate information of a light source provided in the second region on the display unit 130, namely, a second light source.

According to the foregoing description of FIG. 4, a case where different light sources are provided in a plurality of different regions, respectively, on the display unit 130, and a user's line of sight gazing at any one or the plurality of regions on the display unit 130 is sensed using a camera corresponding to the different light sources, respectively, has been described. However, it is possible to sense a user's line of sight gazing at any one of the plurality of regions using one camera.

Figure 5A:
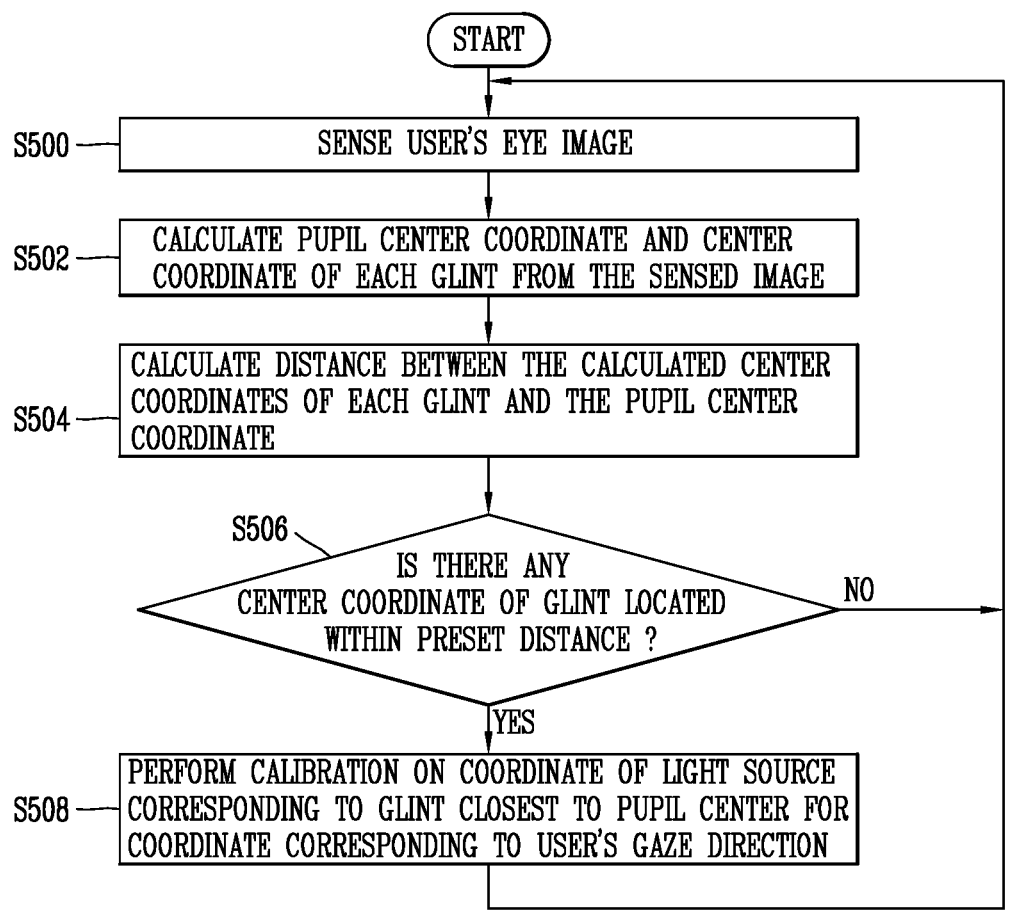
FIG. 5A is a flow chart for performing calibration according to a user's line-of-sight direction based on glints formed from a plurality of light sources in a vehicle control apparatus according to an embodiment of the present disclosure and conceptual views illustrating the same.

Next, FIG. 5A illustrates a flow chart for performing calibration according to a user's line-of-sight direction based on glints formed from a plurality of light sources in the vehicle control apparatus 100 according to such an embodiment of the present disclosure. Referring to FIG. 5A, the controller 110 of the vehicle control apparatus 100 can activate at least one light source and a camera when the driving of the vehicle is started as described above. For example, the driving of the vehicle may denote the time when the vehicle starts. Furthermore, the controller 110 can sense a user's eye image through the activated camera (S500).

When the user's eye image is acquired in the step S500, the controller 110 can detect a region corresponding to the user's pupil and a region corresponding to glints. Here, the glints may be formed by lights emitted from a plurality of light sources provided in different regions on the display unit 130. Then, the controller 110 can calculate a first coordinate that is a center coordinate from the detected pupil region, and calculate the center coordinates of the each glint as second coordinates (S502).

When the second coordinates are calculated in the step S502, the controller 110 can calculate separation distances between each of the second coordinates and the first coordinate (S504). It is also possible to check whether or not there is a second coordinate located within a preset distance from the first coordinate based on a result calculated in the step S504 (S506). As a result of the check in the step S506, when there does not exist the center coordinate of a glint (second coordinate) located within a preset distance from the center of pupil, namely, the first coordinate, the controller 110 can proceed to the step S500 again to sense the user's eye image, and proceed to the steps S502 through S506 to recheck whether or not there exists the center coordinate of a glint located within a preset distance from the center of pupil (first coordinate).

As a result of the check in the step S506, when there exist at least one center coordinate of a glint (second coordinate) located within a preset distance from the center of pupil, namely, the first coordinate, the controller 110 can perform the calibration of a coordinate corresponding to a direction in which the user currently gazes based on the coordinate of a light source corresponding to the nearest glint among at least one second coordinate located within a preset distance from the center of pupil (S508). This is because a glint formed at a position closer to the center of pupil is highly likely a glint formed from a light source provided in a region on the display unit 130 corresponding to a region at which the user gazes.

FIG. 5B is a conceptual view illustrating an example of sensing a user's line of sight gazing at one region on the display unit 130 corresponding to any one of the glints according to the foregoing process described in FIG. 5A. FIG. 5B(a) illustrates an example of an eye image including glints formed from different light sources on the display unit 130. Here, a first glint 502, a second glint 512 and a third glint 522 among the glints are formed from each light source formed in a first region, a second region and a third region which are different regions, respectively, on the display unit 130. Furthermore, the second region may be one region on the display unit 130 formed in the front direction of the user, and the first and the third region may be one region on the display unit 130 formed at the user's right and left sides, respectively, based on the user.

Then, the controller 110 can calculate center coordinates from the glints 502, 512, 522, respectively. In other words, the controller 110 can calculate a first glint center coordinate 500 from the first glint 502, and calculate a second glint center coordinate 510 from the second glint 512, and calculate a third glint center coordinate 520 from the third glint 522. The controller 110 can also calculate a separation distance between the calculated each glint center coordinate and the first coordinate calculated from the center of pupil.

Accordingly, when an eye image sensed as the user gazes at the front is as illustrated in FIG. 5B(a), the controller 110 can detect that the second glint center coordinate 510 is located within a preset distance from the first coordinate 210. Then, the controller 110 can determine that the user gazes at a region on the display unit 130 including a second light source corresponding to the second glint center coordinate 510, namely, second region. Thus, the controller 110 can calibrate a coordinate corresponding to a case where the user's line-of-sight direction in which the user gazes at the second region, namely, the user's line of sight, is the left direction based on predefined coordinate information of the second light source.

When an eye image sensed as the user gazes at the left is as illustrated in FIG. 5B(b), the controller 110 can detect that the third glint center coordinate 520 is located within a preset distance from the first coordinate 210. Then, the controller 110 can determine that the user gazes at a region on the display unit 130 including a third light source corresponding to the third glint center coordinate 520, namely, third region. Accordingly, the controller 110 can calibrate a coordinate corresponding to a case where the user's line-of-sight direction in which the user gazes at the third region, namely, the user's line of sight, is the left direction based on predefined coordinate information of the third light source. Thus, the vehicle control apparatus 100 according to the present disclosure can perform calibration for coordinates corresponding to a plurality of different user's line of sights.

The present disclosure can perform calibration when a specific condition (the center coordinate of a glint is formed within a preset distance from the center coordinate of pupil) is satisfied as described above, thereby arbitrarily performing calibration for a time of the calibration or a specific direction. Accordingly, the present disclosure can determine whether or not calibration is required to prevent a case where calibration is not performed as the condition is not satisfied even though the calibration is required, and guide a user's action to satisfy the specific condition when the calibration is required.

For example, the controller 110 of the vehicle control apparatus 100 according to an embodiment of the present disclosure can determine that the calibration is required when the calibration has not been performed for more than a preset period of time. In this instance, the controller 110 can determine whether or not calibration is required for a plurality of different directions, respectively. Here, when whether or not calibration is required is determined according to an elapsed time after calibration was most recently performed as described above, the controller 110 can measure an elapsed time after a time point at which previous calibration was performed for the plurality of different directions, respectively. In addition, the controller 110 can determine whether or not calibration for a specific direction is required based on the measured elapsed time.

When it is determined that calibration for a specific direction is required, the controller 110 can display one region on the display unit 130 corresponding to a direction in which calibration is required to be distinguished from the other region. Here, one region on the display unit 130 can be a region including at least one light source capable of forming a glint.

Further, displaying one region on the display unit 130 corresponding to the direction in which the calibration is required to be distinguished from the other region can be to call the user's attention. In other words, the controller 110 can display the one region to be further highlighted than the other region on the display unit 130, thereby guiding the user to pay attention to the relevant region. In this instance, a difference between a brightness of the one region and a brightness of the other region on the display unit 130 can be less than a preset level. Alternatively, it is possible to display the color of the one region as well as the brightness thereof to be different.

In addition, the controller 110 can guide the user to pay attention to one region on the display unit 130 corresponding to a specific direction in which the calibration is required using various methods. For example, the controller 110 can display a specific graphic object displayed in one region determined in which the calibration is required to be different from the other region. In other words, the controller 110 can display a text displayed in the one region with a bolder font than that displayed in the other region. Alternatively, the controller 110 can display notification information for notifying the occurrence of a preset key event in one region on the display unit 130 determined in which the calibration is required. Accordingly, when the user gazes at one region on the display unit 130 displayed with the graphic object or the notification information displayed in a distinguished manner, the controller 110 can perform calibration based on a glint formed from a light source provided in the one region.

According to the foregoing description, whether or not calibration is required has been merely determined based on an elapsed time after calibration was previously performed, but whether or not the calibration is required may be determined using a different method. For example, the controller 110 can determine whether or not calibration for a direction in which the user currently gazes is required based on a coordinate on the display unit 130 corresponding to the direction in which the user currently gazes and a coordinate of a touch input point applied from the user.

Figure 6:
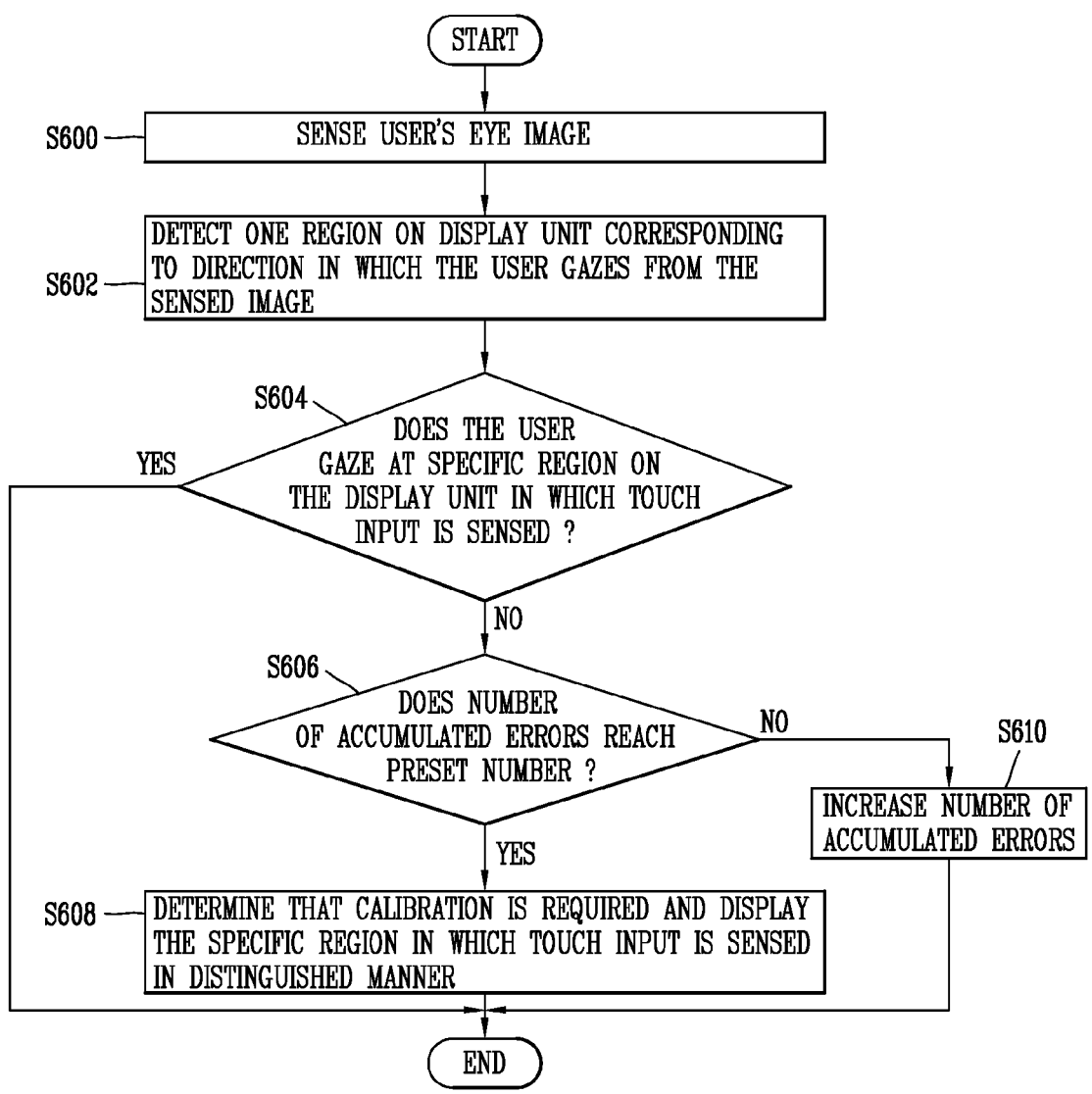
FIG. 6 is a flow chart illustrating an operation process of an embodiment for determining whether or not calibration is required in a vehicle control apparatus according to an embodiment of the present disclosure.

Next, FIG. 6 is a flow chart illustrating an operation process of an embodiment for determining whether or not calibration is required in the vehicle control apparatus 100 according to an embodiment of the present disclosure. In the following description, the display unit 130 being divided into a plurality of different regions, and the plurality of different regions including the corresponding light sources, respectively, will be described as an example.

First, the controller 110 can sense a user's touch input applied to one point on the display unit 130. Furthermore, the controller 110 can check whether or not a point to which the touch input is applied is located within a preset distance from a light source formed in one region on the display unit 130 including the point to which the touch input is applied. The controller 110 can determine whether or not calibration is required based on a region on the display unit 130 to which the touch input is applied within a preset distance from the light source and a coordinate corresponding to a direction in which the user currently gazes.

As described above, when a point at which a touch input is sensed is located within a preset distance from a light source provided in a specific region on the display unit 130, the controller 110 can sense a user's eye image (S600). Furthermore, the controller 110 can detect one region on the display unit 130 corresponding to a direction in which the user currently gazes from the sensed eye image (S602).

For example, the step S602 may be a process similar to the process described in the above FIG. 2A. In other words, the controller 110 can calculate a pupil center coordinate from the sensed eye image, and calculate a glint center coordinate from each glint included in the eye image. When at least one of the calculated glint center coordinates is located within a preset distance from the pupil center coordinate, the controller 110 can determine that the user gazes at any one of a plurality of regions on the display unit 130. Here, when there exist a plurality of glint center coordinates located within a preset distance from the pupil center coordinate, the controller 110 can determine that the user gazes at one region on the display unit 130 corresponding to a glint center coordinate that is closest to a pupil center coordinate among the glint center coordinates located within the preset distance.

Further, it is determined that the user gazes at any one region on the display unit 130, the controller 110 can detect one region on the display unit 130 corresponding to a direction in which the user gazes. For example, the controller 110 can detect that the user gazes at one region on the display unit 130 including a light source corresponding to any one glint center coordinate (for example, a glint center coordinate that is closest to the pupil center coordinate) within a preset distance from the pupil center coordinate.

Further, in the step S602, when one region on the display unit 130 at which the user gazes is detected, the controller 110 can determine whether or not the user gazes at a specific region on the display unit 130 including a point at which the touch input is sensed based on the detected region (S604). For example, the controller 110 can determine that the user gazes at the specific region when the one region detected in the step S604 is the same as a specific region on the display unit 130 including a point to which the touch input is applied, and determine that the user does not gaze at the specific region when the detected one region is not the same as the specific region.

When one region on the display unit 130 detected in the step S602 and a specific region on the display unit 130 including a point at which the touch input is sensed are the same region as a result of the determination in the step S604, the controller 110 can determine that the execution of calibration for a user's line-of-sight direction corresponding to the specific region is not required. Typically, this is because when the user applies a touch input to one point on the display unit 130, the user applies the touch input when he or she gazes at a specific point to which the touch input is applied to enhance the accuracy of the touch input. Accordingly, when one region on the display unit 130 at which the user gazes and a specific region on the display unit 130 corresponding to a point to which the touch input is applied are the same, the controller 110 can determine that the execution of calibration for a direction corresponding to one region of the display unit 130 is not required.

As a result of the check in the step S604, when one region on the display unit 130 detected in the step S602 is different from a specific region on the display unit 130 including a point at which the touch input is sensed, the controller 110 can determine that there is an error for a direction corresponding to the specific region on the display unit 130. In this instance, the controller 110 can determine that calibration is required. Furthermore, the controller 110 can display the specific region on the display unit 130 including the point at which the touch input is sensed to be distinguished from the other region.

However, even when it is determined that there is an error according to a result of the check in the step S604, the controller 110 can defer its determination on whether or not calibration is required. This is because there exist a case where the user applies a touch input while gazing at another place due to his or her familiarity with the environment within the vehicle or the user enters an incorrect input. Accordingly, as a result of the check in the step S604, when one region on the display unit 130 detected in the step S602 is different from a specific region on the display unit 130 including a point at which the touch input is sensed, the controller 110 can check whether or not a number of accumulated error occurrences up to the present is greater than a preset number (S606).

As a result of the check in the step S606, when a number of accumulated errors up to the present is less than a preset number, the controller 110 can increase the number of accumulated errors (S610). Furthermore, the controller 110 can end the process of determining whether or not to calibrate.

However, as a result of the check in the step S606, when the number of accumulated errors reaches a preset number, the controller 110 can determine that calibration for a direction corresponding to the specific region on the display unit 130 is required. Accordingly, the controller 110 can display the specific region on the display unit 130 including a point at which the touch input is sensed to be distinguished from the other region (S608). Then, when calibration for a coordinate in a user's line of sight direction is performed for the specific region on the display unit 130 displayed in a distinguished manner, the controller 110 can initialize the number of accumulated errors.

Further, a determination on whether or not calibration is required as illustrated in FIG. 6 may be performed while at the same performing calibration for a direction corresponding to the other region on the display unit 130. In other words, as a result of the check in the step S604, when one region on the display unit 130 detected in the step S602 is different from a specific region on the display unit 130 including a point at which the touch input is sensed, the controller 110 can perform calibration according to the coordinate of a light source provided in one region on the display unit 130 detected at which the user currently gazes. For example, the calibration may be performed through an operation process similar to the foregoing processes described in FIGS. 2A through 5A.

Furthermore, separately from the calibration process, the process of steps S604 through S610 in FIG. 6 may be performed. Accordingly, the user can gaze at a specific region (a region including a point at which the touch input is sensed) on the display unit 130 displayed in a distinguished manner in the step S608, and thus perform calibration based on the coordinate of a light source provided in the specific region.

As a result of the detection in the step S602, a region on the display unit 130 at which the user gazes may not be detected. For example, as a result of the detection, there may be no glint center coordinate within a preset distance from a pupil center coordinate among glint center coordinates extracted from glints, respectively. In this instance, the controller 110 can determine that the user does not gaze at any region among a plurality of regions on the display unit 130.

When there is no region on the display unit 130 at which the user gazes as described above, the controller 110 can determine that the user does not gaze at the specific region on the display unit 130 at which the touch input is sensed in the step S604. Accordingly, the controller 110 can proceed to the step S610 according to a result of the determination in the step S606 to increase the number of accumulated errors or proceed to the step S608 to display the specific region on the display unit 130 including a point at which the touch input is sensed to be distinguished from the other regain.

The foregoing description has described a case where the specific region on the display unit 130 is displayed in a distinguished manner as a display for calling the user's attention when it is determined that calibration is required. However, when the user's attention is called as the specific region is displayed in a distinguished manner as described above, it may disperse the user's line of sight. In this instance, a dangerous circumstance may occur when the user is driving, and thus the controller 110 can collect information on an output for calling the user's attention, namely, the running state of the vehicle and the current location of the vehicle, and the surrounding circumstances of the vehicle, prior to displaying the specific region in a distinguished manner. Furthermore, the specific region, namely, a region on the display unit 130 corresponding to a direction in which calibration is required, may be displayed in a distinguished manner based on the collected information.

For example, the controller 110 can determine whether or not to display the specific region in a distinguished manner based on the speed of the vehicle. In other words, when a current speed of the vehicle is less than a preset speed, the controller 110 can display the specific region corresponding to a direction in which calibration is required in a distinguished manner. When a current speed of the vehicle exceeds a preset speed, the controller 110 can display the specific region corresponding to a direction in which calibration is required in a non-distinguished manner.

Further, in addition to the speed, the controller 110 can determine whether or not to display the screen region in a distinguished manner according to a result of sensing an environment surrounding the vehicle. For example, the controller 110 can display the screen region in a non-distinguished manner when it is severe weather such as rain, fog and the like or an obstacle such as another vehicle exists within a predetermined distance from the surrounding of the vehicle. Alternatively, when a current location of the vehicle is an accident prone area or a width of road is less than a preset level or the vehicle is traveling an unpaved road, the controller 110 can display the screen region in a non-distinguished manner. When a time zone in which the vehicle is currently running is a traffic congestion time zone such as a commute time, the screen region may be displayed in a non-distinguished manner. It is because allowing the user to safely drive the vehicle is more important than performing the calibration.

The foregoing description has described an example in which at least one light source is provided in one region of the display unit 130 or adjacent to the one region, but the display unit 130 can be formed in various regions within the vehicle. For example, the display unit 130 can be formed in at least one region on a windshield glass of the vehicle in the form of a head-up display (HUD). Even when the display unit 130 is formed on the windshield glass, the present disclosure can be applied thereto.

For example, at least a partial region of a windshield glass of the vehicle including the vehicle control apparatus 100 according to an embodiment of the present disclosure can be formed in the form of a transmissive display unit. Alternatively, a vehicle including the vehicle control apparatus 100 according to an embodiment of the present disclosure can include an output unit configured to output image information on the windshield glass to display image information in a reflective manner in at least one region on an inner surface of the windshield glass. Accordingly, at least a partial region of the windshield glass may perform the role of the display unit 130 for displaying image information.

When at least a partial region of the windshield glass is formed to perform a function of the display unit 130, the light source unit 170 can include at least one light source configured to emit preset light to at least one point on a region of the windshield glass performing the function of the display unit 130. In this instance, light emitted from the light source may be reflected on one point of the windshield glass, and reflected light reflected on one point of the windshield glass may be incident to the user's eye to form a glint. A coordinate of one point of the windshield glass reflecting the light of the light source may be a reference coordinate for performing calibration, and previously calculated or defined and stored in the memory unit 120.

Further, where there are a plurality of light sources configured to emit light to a region of the windshield glass performing a function of the display unit 130, the reference coordinate may be calculated based on a plurality of points of the windshield glass on which light emitted from the plurality of light sources are reflected. Accordingly, when the user gazes at image information (for example, traveling information, etc.) displayed through at least one region of the windshield glass, a coordinate according to the user's line of sight direction may be calibrated based on the reference coordinate.

The foregoing description has described that calibration is performed by detecting that the user gazes at image information displayed on the display unit 130, but the present disclosure is not limited to this. In other words, the calibration can be performed based on an identifiable shape through the windshield glass.

For example, as described above, when at least one light source is displayed on a windshield glass, at least one reflection point on the windshield glass on which light emitted from the at least one light source may perform the role of a reference point capable of calculating the coordinate of each region of the windshield glass. In this instance, the controller 110 can sense an image of the windshield glass including the at least one reflection point to perform a coordinate transformation on the sensed windshield glass region at preset intervals based on the at least one reflection point. Then, the controller 110 can calculate the positions of various shapes identified through the windshield glass as coordinates, and carry out calibration using the calculated coordinates.

Figure 7:
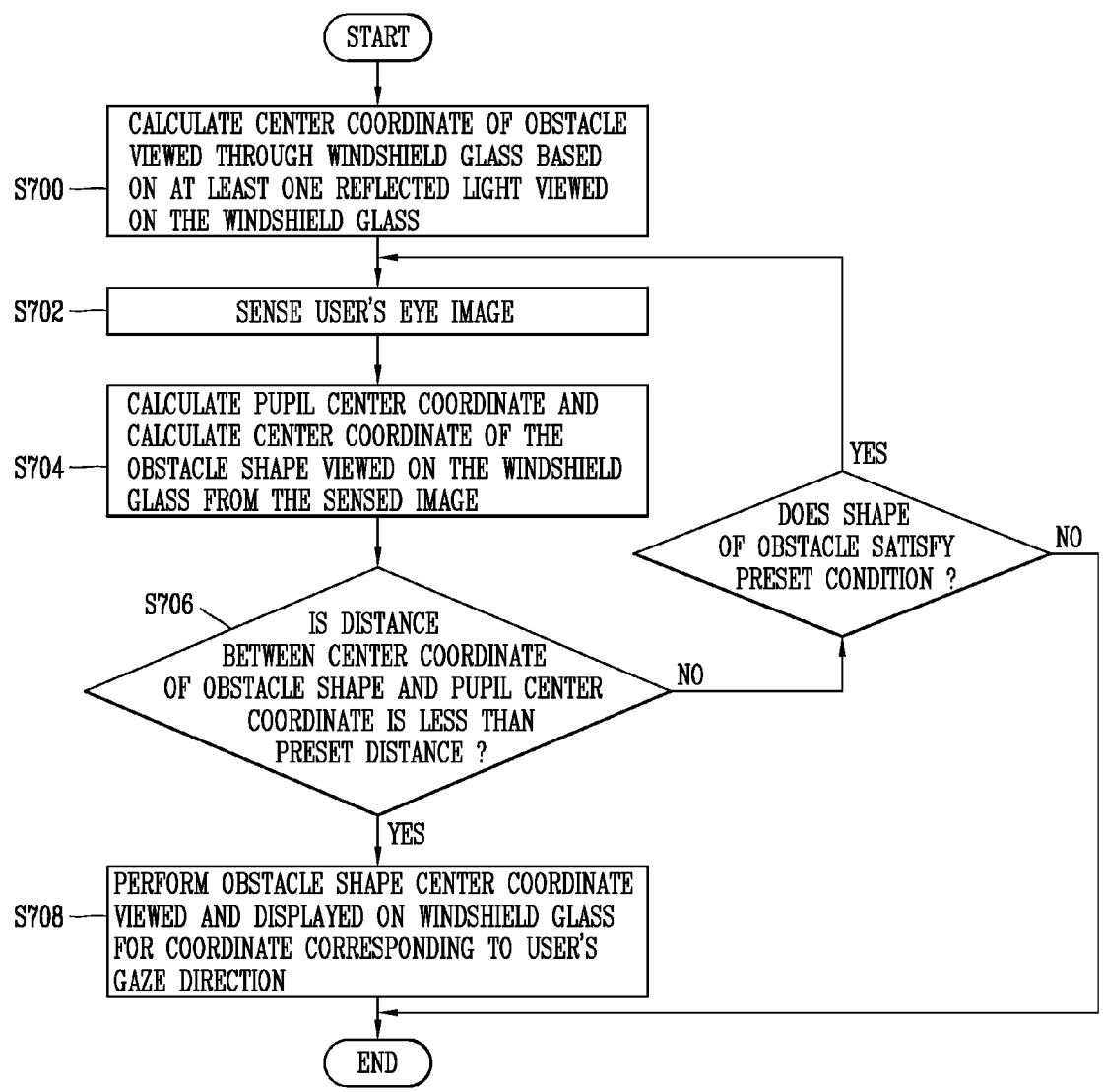
FIG. 7 is a flow chart illustrating an operation process of performing calibration based on a shape of an obstacle viewed on a windshield glass in a vehicle control apparatus according to an embodiment of the present disclosure.

Next, FIG. 7 is a flow chart illustrating an operation process of performing calibration based on a shape of an obstacle viewed on a windshield glass in the vehicle control apparatus 100 according to an embodiment of the present disclosure. Hereinafter, the description of FIG. 7 will describe an example in which the vehicle control apparatus 100 according to an embodiment of the present disclosure includes a camera (first camera) capable of sensing a user's eye image as well as a camera (second camera) capable of sensing an image of identifiable obstacle through the windshield glass.

First, the controller 110 of the vehicle control apparatus 100 controls the second camera to sense an image of at least one region of the windshield glass. Here, the sensed image may include at least one reflection point. Furthermore, the controller 110 can perform a coordinate transformation on at least one region on the windshield glass based on the at least one reflection point.

An image sensed through the second camera can include an obstacle viewed through the windshield glass, for example, a shape of a vehicle located at the front. Then, the controller 110 can calculate the center coordinate of the obstacle from a region in which the shape of the obstacle is detected (S700).

The obstacle may be any one that satisfies a preset condition. For example, the obstacle may be one for which the position displayed through the windshield glass has not been changed for more than a preset period of time above a preset level. In addition, a criterion for determining a change or non-change of the position may be whether or not the position of the calculated center coordinate of the obstacle has been changed. In other words, when a shape of the obstacle for which the center coordinate has not changed for more than a preset period of time above a preset level, the preset condition may be satisfied, and only when an obstacle that satisfies the preset condition is detected, the process of the steps S700 through S710 may be performed.

When the center coordinate of an obstacle is calculated in the step S700, the controller 110 can control the first camera to sense a user's eye image (S702). Then, the controller 110 can detect whether or not a shape of an obstacle viewed through the windshield glass is included in the sensed image in the step S702. In other words, the controller 110 can detect whether or not there is a glint region formed from the shape of the obstacle. When the shape (glint) of the obstacle is included in the sensed user's eye image, the controller 110 can calculate a pupil center coordinate from the user's pupil region included in the eye image, and calculate a center coordinate from the image of the obstacle, namely, the glint (S704).

The controller 110 can calculate a separation distance between the detected coordinates to detect whether or not an image of an obstacle viewed on the user's eye, namely, the center coordinate of a glint, is located within a preset distance from the pupil center coordinate (S706). When the center coordinate of the glint is not located within a preset distance from the pupil center coordinate as a result of the detection in the step S706, the controller 110 can detect again whether or not an obstacle shape of the windshield glass corresponding to the glint satisfies a preset condition (S710). When the shape of the obstacle does not satisfy a preset condition as a result of the detection in the step S710, the controller 110 can end the operation process of FIG. 7.

When the shape of the obstacle satisfies a preset condition as a result of the detection in the step S710, the controller 110 can proceed to the steps S702 and S704 to recalculate the pupil center coordinate and the center coordinate of the glint. Furthermore, the controller 110 can proceed to the step S710 again as a result of the detection in the step S706.

As a result of the detection in the step S706, when the center coordinate of the glint is located within a preset distance from the pupil center coordinate, the controller 110 can determine that the user gazes at the shape of the obstacle viewed through the windshield glass. Then, the controller 110 can perform calibration based on the shape of the obstacle viewed through the windshield glass (S708).

Here, the controller 110 can use the center coordinate of the obstacle shape viewed through the windshield glass as a reference coordinate for the calibration. In other words, the controller 110 can perform calibration on the center coordinate of the obstacle shape calculated from an image sensed in the step S700 for a coordinate corresponding to a direction in which the user currently gazes. Accordingly, the vehicle control apparatus 100 according to an embodiment of the present disclosure can perform calibration according to a direction in which the user's line of sight faces based on a preset or calculated reference coordinate even when the user gazes at an obstacle displayed through the windshield glass as well as when the user gazes at image information displayed on the display unit 130.

The foregoing description has described an example in which at least one light source having a preset coordinate is included in one region on the display unit 130 displayed with image information at which the user frequently gazes such as traveling information or around the one region. This is because the calibration is more frequently performed to more accurately detect the coordinate of a point corresponding to a user's line of sight.

However, the calibration may not be frequently performed above a preset level. For example, when the user continuously gazes at one point on the display unit 130, a resultant continuous calibration process may not be repeatedly performed. Accordingly, the controller 110 of the vehicle control apparatus 100 according to an embodiment of the present disclosure can preset a condition capable of performing the calibration, and control the calibration to be performed only when the preset condition is satisfied.

For example, the calibration execution condition may be an elapsed time. In other words, when a pupil center coordinate through an image sensed through the camera and a coordinate calculated from at least one glint satisfy a preset condition, the controller 110 can measure an elapsed time up to the present after calibration corresponding to a direction in which the user's line of sight currently faces was performed. When the measured time is less than a preset time, the controller 110 can omit calibration for a direction in which the user's line of sight currently faces.

Alternatively, the calibration execution condition may be the occurrence of a preset event. For example, the controller 110 can activate an automatic calibration function for automatically performing calibration when a pupil center coordinate and a coordinate calculated from at least one glint satisfy a preset condition only when an event occurs such as the reception of a message or the occurrence of notification information.

In this instance, the controller 110 can display a graphic object for notifying a currently occurring event in one region on the display unit 130 while at the same sensing a user's eye image gazing at a region displayed with the graphic object through the activated camera. Furthermore, the controller 110 can perform calibration according to a result of analyzing the sensed image. When the calibration has been calibration, the controller 110 can switch the automatic calibration function to an inactive state, and maintain a state that the automatic calibration function is deactivated. Accordingly, it is possible to reduce unnecessary power consumed to continuously maintain the camera, light source and the like in an active state.

In addition, the controller 110 can deactivate the automatic calibration function according to a sensing result sensed from another constituent element provided in the vehicle, for example, a constituent element such as advanced driver assistance system (ADAS). For example, the controller 110 can sense an obstacle located at the front from the ADAS. Then, the controller 110 can determine whether or not to activate the automatic calibration function according to a distance between the sensed obstacle and the vehicle provided with the vehicle control apparatus 100 according to an embodiment of the present disclosure.

Alternatively, the controller 110 can activate a function of carrying out calibration based on a shape of an obstacle viewed through the windshield glass as described above according to a sensing result of the ADAS. For example, when an obstacle is not sensed within a preset distance from the front as a result of the sensing of the ADAS, the controller 110 can maintain a function of performing calibration in an inactive state based on the shape of the obstacle viewed through the windshield glass. Accordingly, the controller 110 can determine whether or not to activate the second camera according to the sensing result of the ADAS without detecting whether or not there exists a shape of an obstacle through the second camera.

In the above description, operation processes according to various embodiments of performing calibration on a coordinate corresponding to a direction in which the user gazes based on a preset reference coordinate in the vehicle control apparatus 100 according to an embodiment of the present disclosure have been described in detail using a plurality of flow charts and conceptual views. Examples in which at least one light source and at least one camera provided in one region on the display unit 130 and around the one region are formed will be described in more detail with reference to a plurality of views.

Figure 8:
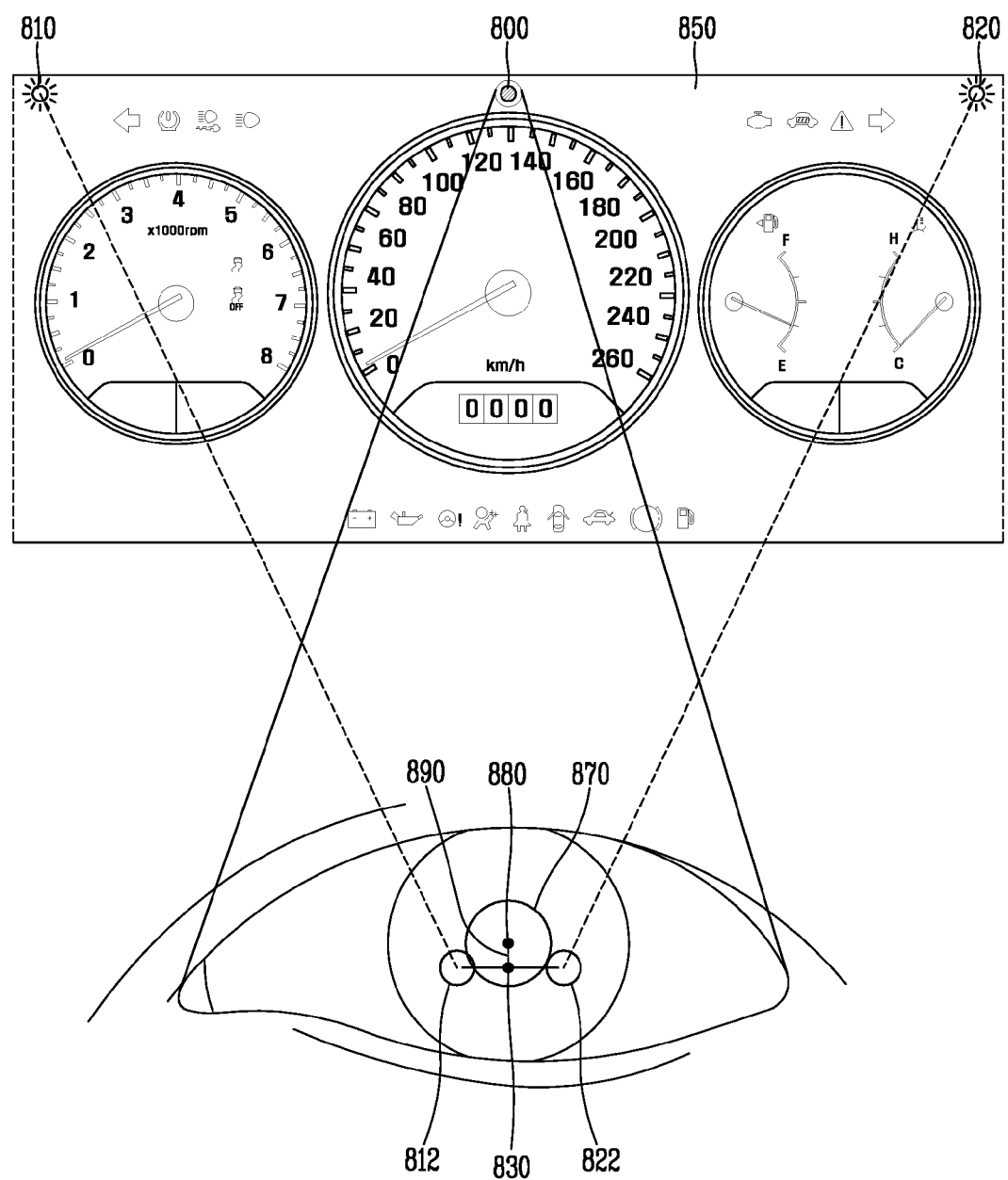
FIG. 8 is an view illustrating an example of a when a user gazes at a region displayed with traveling information in a vehicle control apparatus according to an embodiment of the present disclosure.

In particular, FIG. 8 is a view illustrating an example of a user gazing at a region displayed with traveling information in the vehicle control apparatus 100 according to an embodiment of the present disclosure. FIG. 8 illustrates an example of a region 850 displayed with traveling information among regions that can be divided into a plural number on the display unit 130. As illustrated in FIG. 8, one region 850 on the display unit 130 can include a plurality of light sources 810, 820, and a camera 800 are provided therein.

Further, FIG. 8 also illustrates an example of a user's eye image sensed from the camera 800 when the user gazes at the region 850 on the display unit 130 displayed with the traveling information. Referring to FIG. 8, the light emitted from the plurality of light sources 810, 820 is reflected on a surface of the user's eyeball or pupil to form glints 812, 822. In this instance, the controller 110 can detect a user's pupil region 870 from an image shown in FIG. 8, and calculate a pupil center coordinate 880 from the detected region. Further, the controller 110 can detect regions formed with the glints 812, 822, and calculate center coordinates, respectively, from the region of each of the glints 812, 822.

When center coordinates are respectively calculated from the region of each of the glints 812, 822, the controller 110 can generate a straight line connecting the calculated center coordinates. Furthermore, the controller 110 can calculate a separation distance 890 between a coordinate 830 corresponding to the center of the generated straight line and the calculated pupil center coordinate 880. When the separation distance 890 is less than a preset distance, the controller 110 can determine that the user gazes at a region (a region displayed with traveling information) 850 on the display unit 130 shown in FIG. 8.

As a result of the determination, when it is determined that the user gazes at the traveling information display region 850, the controller 110 can calculate the coordinate of one point calculated from the plurality of light sources 810, 820 as a reference coordinate. For example, the controller 110 can read the coordinate information of the plurality of light sources 810, 820, respectively from the memory unit 120, generate a virtual straight line connecting the read coordinates to each other, and calculate the coordinate of one point on the traveling information display region 850 corresponding to the center of the generated straight line as a reference coordinate. The controller 110 can perform calibration based on the calculated reference coordinate.

Here, the calibration may be a process for compensating a coordinate calculated according to the position of a pupil center shown in the second drawing of FIG. 8 with the reference coordinate. For example, the controller 110 can calculate the center of the user's eyeball (for example, rotating point) based on preset human eyeball modelling data, and form a vector passing through the center of the pupil from the calculated eyeball center. The controller 110 can also calculate a coordinate of one point within the vehicle corresponding to a direction in which the vector advances as a coordinate corresponding to a direction in which the user currently gazes. The controller 110 can generate a coordinate compensation value according to a difference between the calculated coordinate and the reference coordinate, and compensate a center coordinate value calculated from a vector passing through the center of the pupil from the user's eyeball center according to the generated coordinate compensation value, thereby performing calibration.

Further, FIGS. 9 and 10 are views illustrating examples in which at least one light source and at least one camera are formed around a region of the display unit in the vehicle control apparatus 100 according to an embodiment of the present disclosure. In particular, FIG. 9 illustrates examples in which at least one camera and at least one light source formed in one region on the display unit 130 according to an embodiment of the present disclosure are provided in a different shape. For example, the at least one light source and at least one camera can be formed to emit light through a groove or hole formed in an active region displayed with image information (at least one light source) or sense image information (at least one camera). FIG. 9(a) illustrates such an example.

Referring to FIG. 9(a), one region of the display unit 130 in the vehicle control apparatus 100 according to an embodiment of the present disclosure can be formed with a groove on which the at least one light source and at least one camera can be provided at an upper end of the active region 930 displayed with image information as illustrated in FIG. 9(a). Accordingly, the light sources 910, 920 may emit preset light through grooves formed in the active region 930. The camera 900 may sense a user's eye image including glints formed by the light sources 910, 920 through grooves formed in the active region 930.

The light sources 910, 920, camera 900 and active region 930 may be covered by a glass 940 with a preset color as illustrated in FIG. 9(a), and accordingly, the shape of the light sources 910, 920 and camera 900 formed at each groove of the active region 930 may not be revealed due to the glass 940. Further, FIG. 9(a) illustrates an example in which the light sources 910, 920 and camera 900 are provided through grooves formed in the active region 930. However, the light sources 910, 920 and camera 900 may be provided in a separated set region.

Next, FIG. 9(b) illustrates an example in which the light sources 910, 920 and camera 900 are provided in a bezel region formed adjacent to the active region 930. In particular, FIG. 9B illustrates an example in which a bezel region 950 is separately formed at an upper end of the active region 930 displayed with image information. Furthermore, the light sources 910, 920 and camera 900 are provided at different points, respectively, of the bezel region 950.

FIGS. 9(a) and 9(b) has described an example in which any one camera 900 is provided in one region on the display unit 130, and a plurality of light sources 910, 920 are formed therein, but only one light source may be provided in one region on the display unit 130, and one camera for sensing a user's line of sight gazing at one region on the display unit 130 may be provided therein. FIG. 10(a) illustrates such an example.

FIG. 10(a) illustrates an example in which one light source 1000 and one camera 1002 are provided in a specific region of the display unit 130. In this instance, the controller 110 can calculate the center coordinate of a glint formed by the light source 1000 from an eye image sensed from the camera 1002, and determine whether or not the user gazes at the specific region of the display unit 130 based on a distance between the calculated center coordinate and the center coordinate of pupil.

According to the foregoing description, the display unit 130 of the vehicle control apparatus 100 according to an embodiment of the present disclosure can be partitioned into a plurality of divided regions. FIG. 10(b) illustrates an example of a display unit partitioned into a plurality of regions and light sources and cameras provided in each region of the display unit 130.

FIG. 10(b) illustrates an example in which the display unit 130 is partitioned into two regions 1070, 1080. For example, the regions 1070, 1080 may be formed so the display units as illustrated in FIG. 10(a) are adjacent to each other. Further, the regions 1070, 1080 of the display unit 130 can respectively include a camera and a light source. In other words, a first light source 1050 and a first camera 1052 may be provided in a first region 1070 as illustrated in FIG. 10(b), and a second light source 1060 and a second camera 1062 may be provided in a second region 1080.

In this state, the first camera 1052 can detect only light emitted from the first light source 1050. On the contrary, the second camera 1062 can detect only light emitted from the second camera 1062. In this instance, as illustrated in the above FIG. 4, glints due to two light sources 1050, 1060 may be formed at the same time on a user's eye, but only a glint formed by the first light source 1050 may be detected on an image sensed from the first camera 1052. On the contrary, only a glint formed by the second light source 1060 may be detected on an image sensed from the second camera 1062. In this instance, the controller 110 can easily distinguish a glint generated within a predetermined distance from the center of the user's pupil formed by a light source provided in which region of the display unit 130 from images sensed at each camera, and accordingly, identify a region of the display unit 130 at which the user gazes.

The foregoing description describes that the vehicle control apparatus 100 according to an embodiment of the present disclosure can determine that calibration for a specific line-of-sight direction is required, and switch the user's attention to gaze a direction in which calibration is required.

Figure 11:
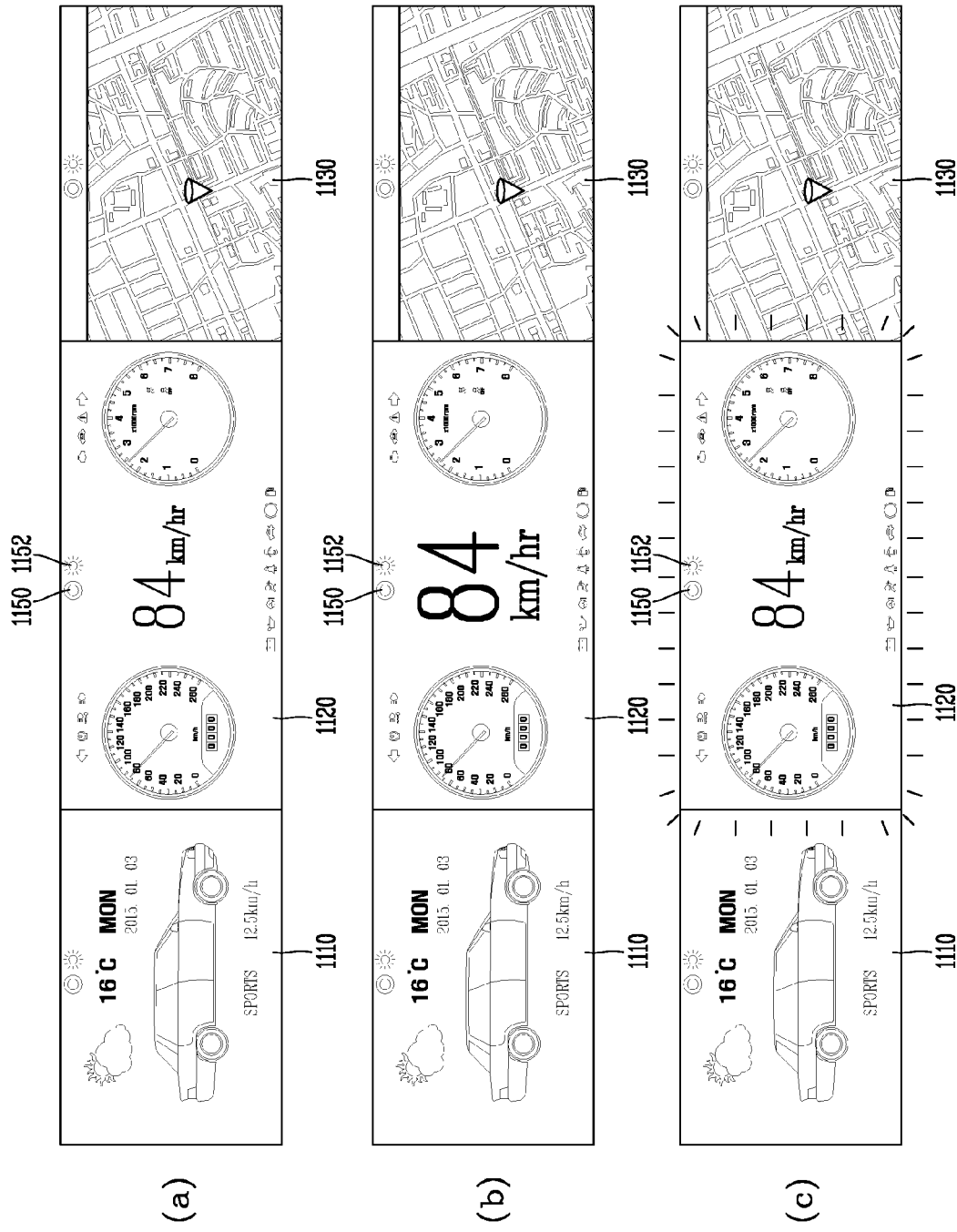
FIG. 11 is an view illustrating an example in which a specific region within a region on the display unit is displayed in a distinguished manner when calibration is required in a vehicle control apparatus according to an embodiment of the present disclosure.

FIG. 11 is a view illustrating an example in which one region on the display unit corresponding to a direction in which calibration is required is displayed in a distinguished manner when calibration is required in the vehicle control apparatus 100 according to an embodiment of the present disclosure in this case to call a user's attention.

FIG. 11(a) illustrates an example of the display unit 130 of the vehicle control apparatus 100 according to an embodiment of the present disclosure. As illustrated in FIG. 11(a), the display unit 130 can be partitioned into a plurality of different regions that can be distinguished from each other, and each region may respectively include at least one light source.

In this state, each region on the display unit 130 can correspond to a user's different line-of-sight direction. For example, a first region 1110 can correspond to a user's left line of sight, a second region 1120 can correspond to a user's front line of sight, and a third region 1130 can correspond to a user's right line of sight. In this state, the controller 110 can sense whether or not the user gazes at which one of the regions from the sensed user's eye image. Furthermore, the controller 110 can perform calibration in a line-of-sight direction corresponding to a region at which the user currently gazes according to a reference coordinate (a coordinate of a light source) of a region at which the user gazes according to the sensing result.

In this state, the controller 110 can detect whether or not there is a line-of-sight direction in which calibration is required. For example, the controller 110 can measure periods of time that have passed from time points at which calibration is performed to the present based on each reference coordinate of the first region 1110, second region 1120 and third region 1130. The controller 110 can detect a line-of-sight direction in which calibration has not been performed for more than a preset period of time based on the measured periods of time.

For example, when calibration has not been performed based on a reference coordinate of the second region 1120 for more than a preset period of time, the controller 110 can determine that calibration for the user's front line of sight is required. Then, the controller 110 can guide the user's attention to allow the user to gaze at a region on the display unit 130 corresponding to the front direction, namely, the second region 1120. For example, such attention guidance may be performed through graphic objects displayed on the second region 1120 or a brightness or color change of the second region 1120.

In addition, the controller 110 can display a text displayed in the second region 1120 in a larger and bolder manner as illustrated in FIG. 11(*b*). Alternatively, the controller 110 can display the brightness of the second region 1120 to be higher than that of the other regions 1110, 1130, thereby guiding the user's attention. Here, the controller 110 can display the second region 1120 to be different from the other regions 1110, 1130 based on the surrounding environment of the vehicle, the location of the vehicle, the running state of the vehicle, or the like.

When the user gazes at the second region 1120 as the second region 1120 is displayed in a distinguished manner, the controller 110 can sense the user's eye image including a glint formed by the light source 1152 of the second region 1120 through the camera 1150 provided in the second region 1120. The controller 110 can also calibrate a coordinate corresponding to the user's front line of sight based on the coordinate of the light source 1152 of the second region 1120 based on a separation distance between the center coordinate of the glint and the pupil center coordinate.

Further, according to the foregoing description, it has been described that the vehicle control apparatus 100 according to an embodiment of the present disclosure can calibrate a coordinate corresponding to a user's line of sight based on an obstacle shape at the front viewed through the windshield glass of the vehicle.

Figure 12:
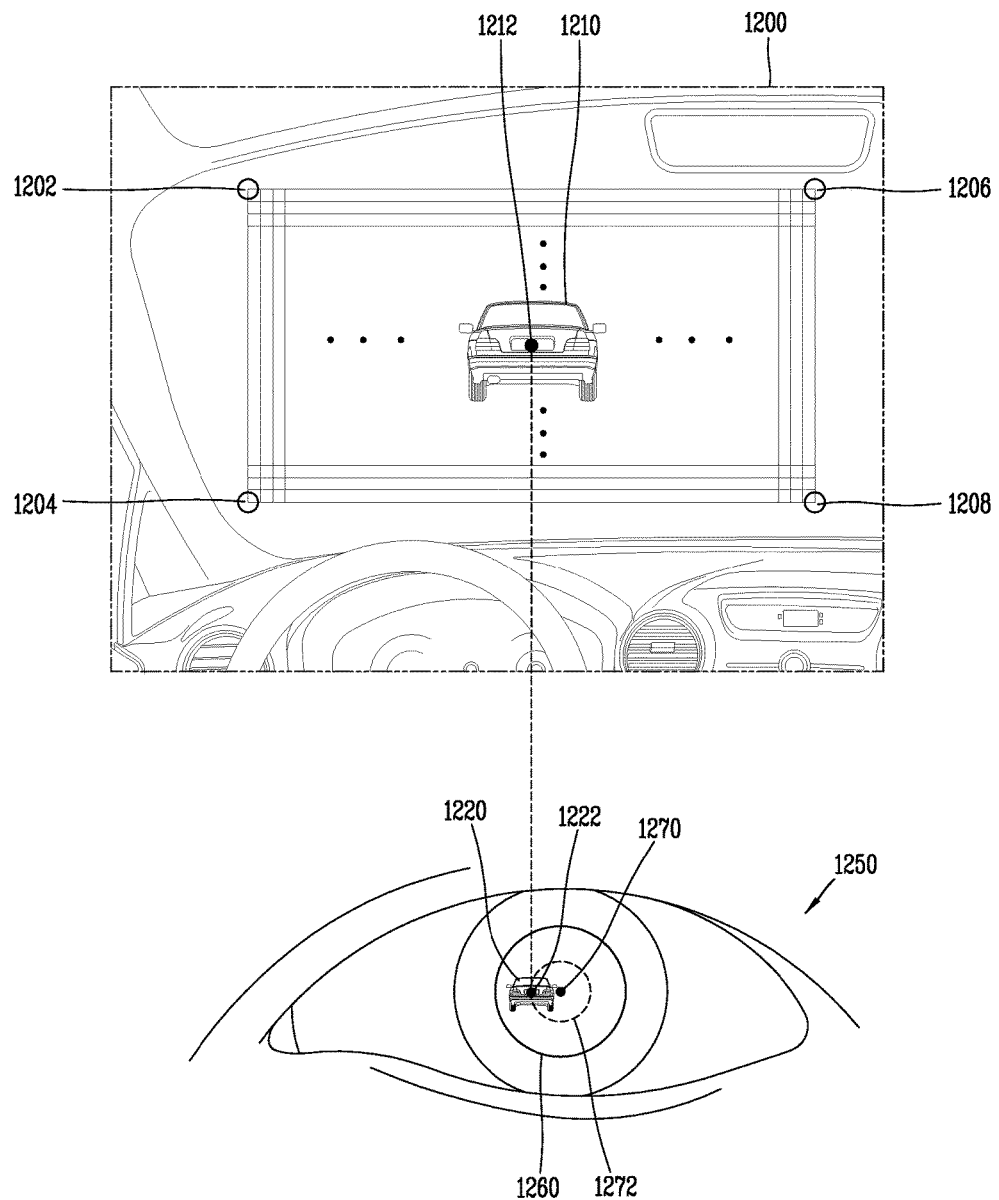
FIG. 12 is an exemplary view illustrating an example in which calibration is performed based on a shape of an obstacle viewed on a windshield glass in a vehicle control apparatus according to an embodiment of the present disclosure.

FIG. 12 is a view illustrating an example in which calibration is performed based on a shape of an obstacle viewed on a windshield glass in the vehicle control apparatus 100 according to an embodiment of the present disclosure. FIG. 12 illustrates part of a windshield glass 1200 at a side of the driver's seat when there is an obstacle located at the front of the vehicle.

First, the light source unit 170 of the vehicle control apparatus 100 according to an embodiment of the present disclosure can include at least one light source configured to emit light to a different point of the windshield glass 1200. Accordingly, a plurality of reflection points may be formed on the windshield glass 1200. In other words, when there exist four light sources configured to emit light to one region of the windshield glass 1200, four reflection points 1202, 1204, 1206, 1208 may be formed as illustrated in the first drawing of FIG. 12.

Further, the controller 110 can sense an image of the windshield glass 1200 including the reflection points 1202, 1204, 1206, 1208 through the second camera provided therein. Furthermore, the controller 110 can perform a coordinate transformation on a region of the windshield glass 1200 using the reflection points 1202, 1204, 1206, 1208 as reference points. Accordingly, the controller 110 can acquire the coordinate of each point in the region of the windshield glass 1200.

FIG. 12 shows that a shape 1210 of another vehicle, namely, an obstacle, located at the front of the vehicle having the vehicle control apparatus 100 according to an embodiment of the present disclosure is viewed through the windshield glass 1200. Accordingly, when the controller 110 senses an image of the windshield glass 1200, the shape 1210 of the obstacle viewed on the windshield glass 1200 may be included in the sensed image.

The controller 110 can calculate a center coordinate of a region in which the shape 1210 of the obstacle is detected from the sensed image. Here, the center coordinate can be calculated as a result of performing a coordinate transformation on the region of the windshield glass 1200 using the reflection points 1202, 1204, 1206, 1208 as reference points. For example, a partial region of the windshield glass 1200 can be transformed to a coordinate 1300 using the reflection points 1202, 1204, 1206, 1208 as reference points as illustrated in the first drawing of FIG. 12, and accordingly, the center coordinate 1212 of the obstacle shape 1210 viewed on the windshield glass 1200 may be calculated.

FIG. 12 also illustrates an example in which an image of the windshield glass 1200 is sensed, and then the controller 110 senses a user's eye image 1250 using the first camera. As illustrated in FIG. 12, when the shape 1210 of an obstacle is viewed through the windshield glass 1200, the sensed user's eye image 1250 can include a glint 1220 formed by the shape 1210 of the obstacle.

Then, the controller 110 can calculate a center coordinate 1222 of the glint 1220 from the eye image 1250. Furthermore, the controller 110 can detect whether or not the calculated center coordinate 1222 of the glint 1220 is located within a preset distance 1272 from a pupil center coordinate 1270 calculated from a user's pupil region 1260. As illustrated in FIG. 12, when the calculated center coordinate 1222 of the glint 1220 is located within the preset distance 1272 from the pupil center coordinate 1270, the controller 110 can determine that the user gazes at a shape corresponding to the glint 1220, namely, the shape 1210 of the obstacle at the front viewed through the windshield glass 1200.

In this instance, the controller 110 can perform calibration according to the user's line-of-sight direction. Here, the controller 110 can use the center coordinate 1212 of the obstacle shape 1210 viewed on the windshield glass 1200 as a reference coordinate. In other words, the controller 110 can compensate the calculated center coordinate 1212 for a coordinate corresponding to a direction in which the user's line of sight currently faces, and reflect a difference value between the center coordinate 1212 and a coordinate calculated from the user's eyeball center and pupil center.

According to the foregoing description, the memory unit 120 can include line-of-sight information for at least one user. Here, the line-of-sight information may be information associated with most recently executed calibration according to a direction corresponding to the user's line of sight and a reference coordinate according to the foregoing embodiment of the present disclosure. In other words, the controller 110 can recognize a user who currently drives the vehicle, and store information according to a calibration result performed when the user drives the vehicle as the line-of-sight information. Furthermore, the line-of-sight information may be one that is stored to correspond to a specific user. In other words, the controller 110 can recognize a user who currently drives the vehicle as a driver, and store information according to a calibration result performed while the driver drives the vehicle as line-of-sight information corresponding to a current driver, namely, a specific user. The controller 110 can update the line-of-sight information whenever calibration is performed.

There are various methods for recognizing a driver. For example, the controller 110 can recognize a specific user as a driver through a facial image of the user sitting on the driver's seat. Alternatively, the controller 110 can recognize a specific user as a driver based on a fingerprint applied through a preset region of a handle. Alternatively, the controller 110 can recognize a driver based on a voice of the user sitting on the driver's seat. Such a driver recognition process may be performed when the driving of the vehicle is started.

When the driver of the vehicle is recognized as a specific user, the controller 110 can initialize coordinate values calculated according to the user's line-of-sight direction based on line-of-sight information corresponding to the user. In other words, when a specific user is recognized as a driver, the controller 110 can compensate a coordinate calculation result corresponding to a direction in which the user gazes according to the relevant user's line-of-sight information stored in the memory unit 120, namely, a calibration result that has been previously performed, even though a preset condition (for example, when a distance between a pupil center coordinate and a center coordinate of a glint formed from a preset light source is within a predetermined distance) is not satisfied. Furthermore, the controller 110 of the vehicle control apparatus 100 according to an embodiment of the present disclosure can perform calibration again according to the preset condition, and reflect the performed calibration result to update line-of-sight information corresponding to a current driver.

Accordingly, even when a driver driving the vehicle is changed to another driver or a driver ends the driving of the vehicle and then restarts the driving of the vehicle, a coordinate according to the line-of-sight characteristics of the user who currently drives the vehicle may be more accurately detected.

A vehicle control apparatus and a control method thereof according to an embodiment of the present disclosure provide the following advantages. First, the present disclosure can perform calibration when a user gazes at one region on the display unit displayed with traveling information to perform the calibration when the user is not conscious of the calibration, thereby having an advantage of performing the calibration without dispersing a line of sight and the user's attention according to the calibration.

The calibration is also performed without a user being conscious not to have a restriction such as a user's input for the calibration, thereby having an advantage of more frequently performing the calibration to more accurately detect a coordinate in a direction in which the user gazes.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 110 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A vehicle control apparatus for a vehicle, the vehicle control apparatus comprising:
   a display configured to display image information associated with the vehicle;
   at least one light source configured to emit light so as to form at least one reflected light in one region of a pupil and eyeball of a user gazing at one region on the display;
   a memory configured to store coordinate information on each of a plurality of regions within the vehicle and the at least one light source;
   a camera unit configured to obtain an image including the one region of the pupil and eyeball of the user; and
   a controller coupled to the display, the at least one light source, the memory and the camera unit, the controller configured to:
   obtain a first coordinate from a center of the pupil and obtain a second coordinate from at least one center of the at least one reflected light, and
   perform calibration for a coordinate corresponding to a direction in which the user gazes based on the first coordinate and the second coordinate,
   wherein the controller is further configured to:
   determine whether the user is gazing at a first point within the vehicle corresponding to the second coordinate based on a distance between the first coordinate and the second coordinate,
   obtain the coordinate corresponding to a direction in which the user gazes and a coordinate corresponding to the first point within the vehicle, from the first coordinate, the second coordinate, and prestored coordinate information of the at least one light source, based on a result of the determination, and
   perform the calibration by compensating the coordinate corresponding to the direction in which the user gazes based on the coordinate corresponding to the first point within the vehicle.

2. The vehicle control apparatus of claim 1, wherein the one region on the display displays traveling information associated with a traveling of the vehicle, and
   wherein the at least one light source is provided in the one region or around the one region on the display on which the traveling information is displayed.

3. The vehicle control apparatus of claim 1, wherein the controller is further configured to determine the user is gazing at the first point within the vehicle if the distance is less than a preset distance according to a preset tolerance range or based on a kappa angle characteristic of the user.

4. The vehicle control apparatus of claim 1, wherein the memory is further configured to store information on a result of the calibration to correspond to a result of identifying a driver who drives the vehicle, and
   wherein the controller is further configured to identify the driver and reflect a prestored calibration result corresponding to the identified driver to calculate coordinates corresponding to a line-of-sight direction of the driver when the driving of the vehicle is started.

5. The vehicle control apparatus of claim 1, wherein the display is partitioned into a plurality of different regions,
   wherein the at least one light source unit includes a plurality of light sources provided in the plurality of different regions, respectively, on the display, and wherein when an image of one region of the pupil and eyeball of the user including a plurality of reflected lights formed by the plurality of light sources is in the obtained image, the controller is further configured to:
identify a region at which the user currently gazes among a plurality of regions on the display based on any one of center coordinates of the plurality of reflected lights and the first coordinate, and
set coordinate information of a corresponding light source provided in the identified region to a reference coordinate to perform the calibration on the reference coordinate for the coordinate corresponding to the direction in which the user gazes.

6. The vehicle control apparatus of claim 5, wherein the controller is further configured to:
calculate the center coordinates of the plurality of reflected lights included in the obtained image, and
identify the region at which the user currently gazes among the plurality of regions on the display based on any one region located within a preset distance from the first coordinate among the calculated center coordinates of the plurality of reflected lights.

7. The vehicle control apparatus of claim 5, wherein the plurality of light sources are configured to emit light distinguished from each other,
wherein the camera unit includes a plurality of cameras corresponding to the plurality of light sources and configured to obtain an image of one region of the pupil and eyeball of the user that includes reflected light by the corresponding light sources, and
wherein the controller is further configured to identify the region at which the user currently gazes among the plurality of regions on the display based on the image in which the distance between the first coordinate calculated from the center of the pupil and the second coordinate calculated from the reflected light is less than a preset distance, among images sensed from the plurality of cameras.

8. The vehicle control apparatus of claim 1, wherein the controller is further configured to:
determine whether or not calibration is required according to a preset condition, and
display one region on the display to be distinguished from another region on the display to set the one region on the display to induce attention of the user when calibration is required.

9. The vehicle control apparatus of claim 8, wherein when the calibration is required, the controller is further configured to:
collect information on a current operating status of the vehicle, a current location of the vehicle, and a surrounding circumstance of the vehicle, and
display the one region on the display to be distinguished from the other region on the display unit based on the collected information.

10. The vehicle control apparatus of claim 8, wherein when a touch input is applied to the one region on the display, the controller is further configured to:
calculate a coordinate corresponding to a direction in which the user currently gazes, and
determine whether or not the calibration is required according to whether or not the calculated coordinate corresponding to a line-of-sight direction of the user is one point within the one region on the display.

11. The vehicle control apparatus of claim 10, wherein the controller is further configured to:
determine that an error has been generated when the calculated coordinate corresponding to the line-of-sight direction is not the one point within the one region on the display, and
display the one region on the display to be distinguished from the other region on the display when a number of the generated errors reaches a preset number.

12. The vehicle control apparatus of claim 10, wherein when a point to which the touch input is applied is located within a predetermined distance from the reference coordinate, the controller is further configured to determine whether or not the calibration is required based on the calculated coordinate corresponding to the line-of-sight direction.

13. The vehicle control apparatus of claim 8, wherein the controller is further configured to:
set a luminosity or color of the one region on the display to be different from that of the other region on the display or display at least one graphic object displayed in the one region on the display to be different from another graphic object displayed in the other region.

14. The vehicle control apparatus of claim 8, wherein the controller is further configured to:
display notification information for notifying an occurrence of a preset event in the one region on the display to distinguish the one region on the display from the other region and induce an attention of the user.

15. The vehicle control apparatus of claim 1, wherein the controller is further configured to display the image information in at least a partial region of a windshield glass of the vehicle,
wherein the at least one light source is further configured to emit light to at least one point of the windshield glass on which the image information is displayed, and
wherein the controller is further configured to:
calculate the second coordinate from at least one reflected light in which the light emitted from the at least one light source is reflected and formed on one region of the windshield glass and the pupil and eyeball of the user, and
calculate the reference coordinate from the coordinate of at least one point of the windshield glass on which the light emitted from the at least one light source is reflected.

16. The vehicle control apparatus of claim 15, wherein the memory is further configured to store information associated with the coordinate of the at least one point of the windshield glass on which the light emitted from the at least one light source is reflected, in advance.

17. The vehicle control apparatus of claim 1, wherein the vehicle control apparatus includes a plurality of light sources,
wherein the camera unit is further configured to obtain an image including a plurality of reflected lights in one region of the pupil and eyeball of the user from the plurality of light sources, and
wherein the controller is further configured to:
generate a virtual straight line or polygon from center coordinates of reflected lights calculated from centers of the plurality of reflected lights,
calculate the second coordinate from the center of the virtual straight line or polygon when the image including the plurality of reflected lights is obtained,
generate a virtual straight line and polygon from the prestored coordinates of light sources corresponding to the plurality of reflected lights, respectively, and set the coordinate of one point on the display calculated from the center of the generated virtual line and polygon to the reference coordinate.

18. The vehicle control apparatus of claim 1, wherein the controller is further configured to:
    maintain the at least one light source and the camera unit in an inactive state,
    sense a surrounding environment of the vehicle, and
    switch the at least one light source and the camera unit to an active state based on the sensed surrounding environment of the vehicle.

19. The vehicle control apparatus of claim 1, wherein the at least one light source is configured to emit light to at least one point of a windshield glass of the vehicle, and
    wherein the camera unit further comprises:
    a sub-camera configured to obtain an image including a shape of an obstacle located at a front side of the vehicle that is viewed through a partial region of the windshield glass of the vehicle, and
    wherein the controller is further configured to:
    perform a coordinate transformation on a partial region of the windshield glass on which the shape of the obstacle is viewed,
    calculate the center coordinate of the shape of the obstacle viewed on the windshield glass based on at least one point of the windshield glass on which light emitted from the at least one light source is reflected, from an image obtained through the sub-camera,
    calculate the first coordinate from an image including one region of the pupil and eyeball of the user and calculate the center coordinate of the shape of the obstacle reflected on one region of the pupil and eyeball of the user as the second coordinate, and
    calibrate a coordinate corresponding to a direction in which the user gazes at the obstacle viewed on the windshield glass using the center coordinate of the shape of the obstacle viewed on the windshield glass as a reference coordinate when a distance between the calculated first and second coordinates is less than a preset distance.

20. A method of controlling a vehicle control apparatus for a vehicle, the method comprising:
    displaying, via a display in vehicle, image information associated with the vehicle;
    emitting, via at least one light source in the vehicle, light so as to form at least one reflected light in one region a pupil and eyeball of a user gazing at one region on the display;
    storing, via a memory, coordinate information on each of a plurality of regions within the vehicle and the at least one light source;
    obtaining, via a camera unit in the vehicle, an image including one region of the pupil and eyeball of the user;
    calculating, via a controller of the vehicle control apparatus, a first coordinate from a center of the pupil and calculate a second coordinate from at least one center of the at least one reflected light included in the obtained image; and
    performing, via the controller, calibration for a coordinate corresponding to a direction in which the user gazes based on the first coordinate and the second coordinate,
    wherein the performing further comprises:
    determining whether the user is gazing at a first point within the vehicle corresponding to the second coordinate based on a distance between the first coordinate and the second coordinate,
    obtaining the coordinate corresponding to a direction in which the user gazes and a coordinate corresponding to the first point within the vehicle, from the first coordinate, the second coordinate, and the coordinate information, based on the result of the determination, and
    performing the calibration by compensating the coordinate corresponding to the direction in which the user gazes based on the coordinate corresponding to the first point within the vehicle.

* * * * *